United States Patent [19]

Okubu et al.

[11] Patent Number: 5,563,464

[45] Date of Patent: Oct. 8, 1996

[54] CIRCUIT FOR ROTATING ULTRASONIC MOTOR

[75] Inventors: Mitsumasa Okubu; Toshihiko Imai, both of Tokyo, Japan

[73] Assignee: Olympus Optical Co., Ltd., Tokyo, Japan

[21] Appl. No.: 437,521

[22] Filed: May 9, 1995

Related U.S. Application Data

[63] Continuation of Ser. No. 192,143, Feb. 4, 1994, abandoned.

[30] Foreign Application Priority Data

| Feb. 9, 1993 | [JP] | Japan | 5-021510 |
| Feb. 24, 1993 | [JP] | Japan | 5-035730 |
| Feb. 24, 1993 | [JP] | Japan | 5-035731 |
| Feb. 24, 1993 | [JP] | Japan | 5-035732 |

[51] Int. Cl.$^6$ .............................. H01L 41/08; H02N 2/00
[52] U.S. Cl. ............................................. 310/316; 310/317
[58] Field of Search .................................. 310/316, 317; 318/116

[56] References Cited

U.S. PATENT DOCUMENTS

| 4,510,411 | 4/1985 | Hakamata et al. | 310/316 |
| 4,743,788 | 5/1988 | Takagi et al. | 310/316 |
| 4,833,358 | 5/1989 | Suzuki et al. | 310/316 |
| 4,853,579 | 8/1989 | Kawasaki et al. | 310/316 |
| 4,868,521 | 9/1989 | Konrad | 310/316 |
| 4,939,402 | 7/1990 | Hirayama et al. | 310/316 |
| 4,952,834 | 8/1990 | Okada | 310/316 |
| 5,021,700 | 6/1991 | Takahashi et al. | 310/316 |
| 5,113,116 | 5/1992 | Wilson | 310/316 |
| 5,121,023 | 6/1992 | Abel | 310/316 |
| 5,130,619 | 7/1992 | Izuno | 318/116 |
| 5,173,631 | 12/1992 | Suganuma | 310/316 |
| 5,355,047 | 10/1994 | Okada | 310/316 |
| 5,376,855 | 12/1994 | Suganuma | 310/316 |

Primary Examiner—Thomas M. Dougherty
Attorney, Agent, or Firm—Louis Weinstein

[57] ABSTRACT

This invention discloses a device for rotating a traveling-wave-type ultrasonic motor having an electromechanical conversion device to which two-phase AC signals generated from a DC power source and having a phase difference of 90 degrees are supplied, the device for rotating a traveling-wave-type ultrasonic motor comprising:

(a) a pulse generating circuit for generating exclusive four-phase pulse signals, the output frequency of each of which can be varied in response to a predetermined supplied digital signal;

(b) an electric power amplifying circuit including switching devices for responding to the four-phase pulse signals and transformers and generating two-phase AC signal having a phase difference of 90 degrees, the two-phase AC signals being supplied to the ultrasonic motor;

(c) a waveform shaping circuit that receives one of the two-phase AC signals to convert an amplitude of the AC voltage into a DC voltage; and (d) a phase comparison circuit which receives an output signal from the waveform shaping circuit and a signal from one of the four-phase pulse signals that corresponds to the signal received by the waveform shaping circuit to detect the phase difference between the output signal and the signal in a certain phase, the phase comparison circuit transmitting an output which is received by the pulse generating circuit, wherein the output frequency from the pulse generating circuit is determined so that the phase difference is made to be a predetermined value.

25 Claims, 22 Drawing Sheets

WAVEFORM OF SIGNAL $V_A$

INPUT WAVEFORM ON NON-INVERTED SIDE AND THAT ON INVERTED SIDE OF COMPARATOR

SHAPED WAVEFORM OF SIGNAL $V_A$

PHASE DIFFERENCE $\Delta\phi$

Waveform of $V_A$

Waveform decayed by resistors $R_{21}$ and $R_{22}$

Waveform having voltage range limited by clamp diodes $D_{21}$ and $D_{22}$

Shaped waveform of $V_A$ $\phi_2$

CIRCUIT FOR ROTATING ULTRASONIC MOTOR

This is a continuation of application Ser. No. 08/192,143, filed Feb. 4, 1994 now abandoned.

BACKGROUND OF THE INVENTION

1. Field of the Invention

The present invention relates to a circuit for rotating an ultrasonic motor, and more particularly to a circuit for rotating an ultrasonic motor which is capable of optimally rotating an ultrasonic motor.

2. Related Art Statement

Hitherto, a variety of circuits each for rotating an ultrasonic motor have been suggested. For example, U.S. Pat. No. 4,510,411 and U.S. Pat. No. 4,743,788 have disclosed a technology utilizing a fact that the voltage level of an output signal (a monitor signal) from a monitor electrode disposed in an ultrasonic motor becomes maximum at the resonant frequency of the ultrasonic motor so as to monitor the voltage level of the monitor signal, wherein the ultrasonic motor is rotated at the resonant frequency or in a frequency range somewhat higher than the resonant frequency in accordance with the voltage level.

Further, U.S. Pat. No. 4,833,358 has disclosed a technology utilizing a fact that the phase of the foregoing monitor signal with respect to the operation voltage is considerably changed in the vicinity of the resonant frequency to monitor the phase of the monitor signal, wherein the ultrasonic motor is rotated at the resonant frequency or in a frequency range somewhat higher than the resonant frequency in accordance with the monitored phase.

On the other hand, U.S. Pat. No. 4,853,579 has disclosed a technology which is capable of determining the optimum operation frequency for the ultrasonic motor by monitoring the difference between the phase of the voltage of the operation signal supplied to the operation electrode of the ultrasonic motor and the phase of the electric current.

However, the technologies disclosed in U.S. Pat. No. 4,510,411, U.S. Pat. No. 4,743,788 and U.S. Pat. No. 4,833,358 encounter a necessity that the monitor electrode is disposed on the ultrasonic motor, resulting in a problem of excessive labor and undesirable degree of cost reduction.

The technology disclosed in U.S. Pat. No. 4,853,579 enables the monitor electrode to be omitted from the structure so that the problem experienced with the U.S. Pat. No. 4,510,411, U.S. Pat. No. 4,743,788 and U.S. Pat. No. 4,833,358 is overcome. However, if a load is applied on to the ultrasonic motor as shown in FIG. 6 (in the loaded state shown in FIG. 6), the state of change in the phase difference is considerably changed due to the load as compared with the non-loaded state. Therefore, if the foregoing technology is applied to a camera having a lens, such as a photographing lens, the overall body of which is moved forward and the load of which is therefore changed considerably, the load is considerably changed due to the change in the attitude at the time of use, and therefore a problem arises in that the optimum operation frequency cannot easily be followed.

OBJECTS AND SUMMARY OF THE INVENTION

A first object of the present invention is to provide a circuit for rotating an ultrasonic motor capable of eliminating a necessity of disposing a special monitor electrode and following an optimum operation frequency over a wide load range.

A second object of the present invention is to provide a circuit for rotating an ultrasonic motor having a low cost waveform shaping circuit.

A third object of the present invention is to provide a circuit for rotating an ultrasonic motor capable of significantly easily performing a signal process.

A fourth object of the present invention is to provide a circuit for rotating an ultrasonic motor capable of correcting manufacturing errors occurring in the ultrasonic motor and following an optimum operation frequency further accurately.

A fifth object of the present invention is to provide a circuit for rotating an ultrasonic motor capable of easily following an optimum operation frequency for an ultrasonic motor which encounters a considerable load change.

According to the present invention, there is provided a circuit for rotating a traveling-wave-type ultrasonic motor having an electromechanical conversion device to which two-phase AC signals generated from a DC power source and having a phase difference of 90 degrees are supplied, the device for rotating a traveling-wave-type ultrasonic motor comprising:

(a) a pulse generating circuit for generating exclusive 4-phase pulse signals, the output frequency of each of which can be varied in response to a predetermined supplied digital signal;

(b) an electric power amplifying circuit including switching devices for responding to the four-phase pulse signals and transformers and generating two-phase AC signals having a phase difference of 90 degrees, the two-phase AC signals being supplied to the ultrasonic motor;

(c) a waveform shaping circuit that receives either of the two-phase AC signals to convert the amplitude of the AC voltage into a DC logical voltage amplitude to transmit the DC logical voltage amplitude; and (d) a phase comparison circuit which receives an output signal from the waveform shaping circuit and the signal in a certain phase among the 4-phase pulse signals that corresponds to the signal received by the waveform shaping circuit so as to detect the phase difference between the output signal and the signal in a certain phase, the phase comparison circuit transmitting an output which is received by the pulse generating circuit, wherein the output frequency from the pulse generating circuit is determined so that the phase difference is made to be a predetermined value.

These objects and advantages of the present invention will become further apparent from the following detailed explanation.

DETAILED DESCRIPTION OF THE PREFERRED EMBODIMENTS

Preferred embodiments of the present invention will now be described.

Figure 1:
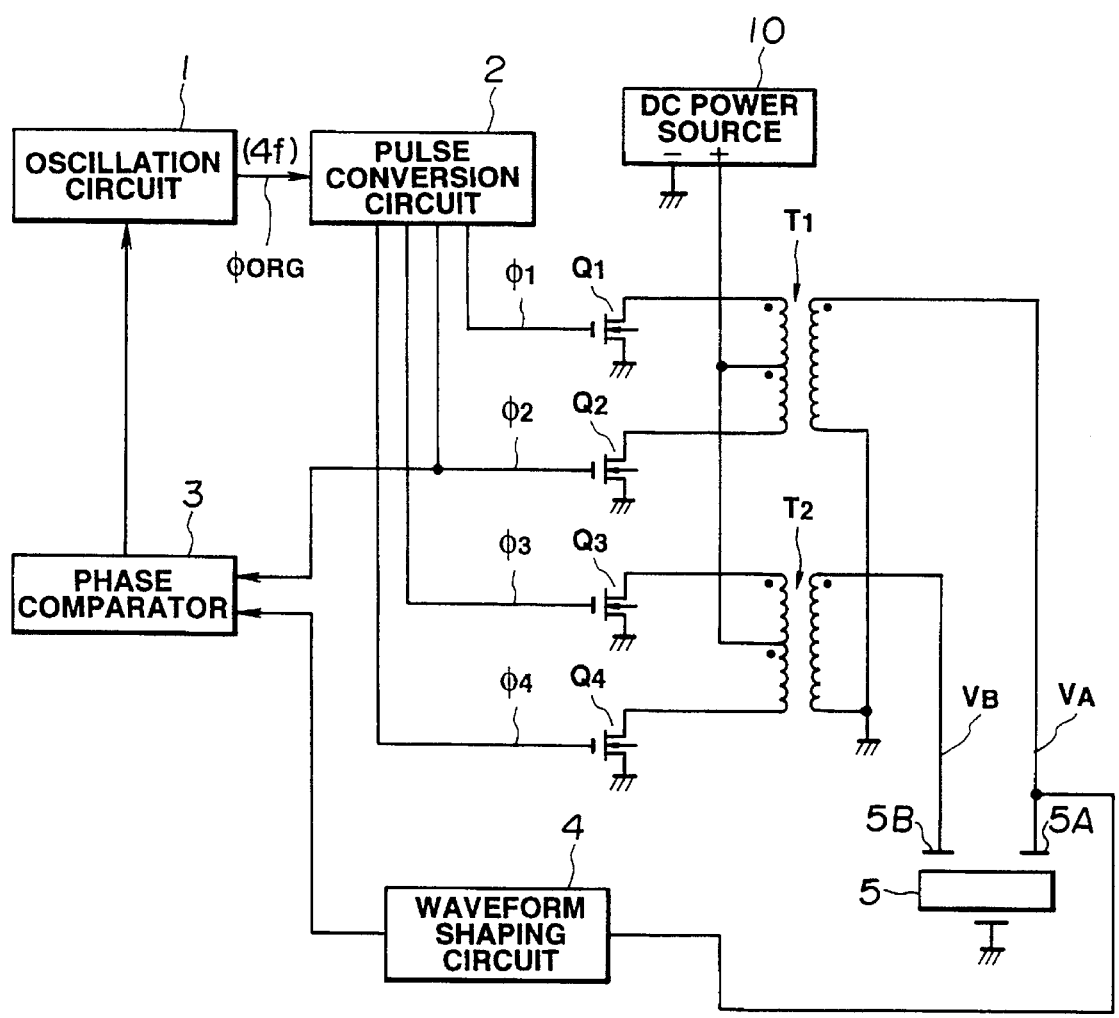
FIG. 1 is an electrical circuit diagram which illustrates a first embodiment of a circuit for rotating an ultrasonic motor according to the present invention.

FIG. 1 is an electrical circuit diagram of a circuit for rotating an ultrasonic motor according to a first embodiment of the present invention. The circuit for rotating a ultrasonic motor according to the first embodiment is arranged in such a manner that a predetermined two-phase AC signal is supplied to a known ultrasonic motor 5 having two electrodes 5A and 5B and the two-phase AC signal is monitored so that the rotations of the ultrasonic motor 5 are controlled.

That is, the rotating circuit further comprises an oscillation circuit 1 for generating and transmitting pulse signal φORG having a frequency which is about four times that the AC operation signal to be supplied to the ultrasonic motor 5. In addition, the rotating circuit includes a pulse conversion circuit 2 for dividing the pulse signal φORG transmitted from the foregoing oscillation circuit 1 into 4-phase pulse signals φ1 to φ4 to transmit them.

Moreover, the rotating circuit comprises switching transistors Q1 to Q4 for performing switching operations to respectively correspond to the pulse signals φ1 to φ4 transmitted from the pulse conversion circuit 2. The rotating circuit further comprises a transformer T1 having an intermediate tap disposed on the primary side thereof to which positive voltage supplied from a DC power source 10 is supplied and arranged in such a manner that the primary side is turned on due to the switching operations of the switching transistors Q1 and Q2 and, therefore, AC signal VA in phase A is transmitted to the secondary side. In addition, the rotating circuit comprises a transformer T2 having the primary side which is turned on due to the switching operations of the switching transistors Q3 and Q4 to transmit AC signal VB in phase B to the secondary side thereof.

The rotating circuit comprises a waveform shaping circuit 4 connected to an output end (on the side of the phase A) of the transformer T1 to convert the AC signal VA into a predetermined digital signal. In addition, the rotating circuit comprises a phase comparator 3 that receives the digital signal transmitted from the waveform shaping circuit 4 and the pulse signal φ2 supplied from the pulse conversion circuit 2 so as to subject the phases of the two signals to a comparison and transmit the result of the comparison, that is, the phase difference between the two signals to the oscillation circuit 1. The foregoing circuits and devices form the main portion of the rotating circuit.

The ultrasonic motor 5 is a known traveling-wave-type ultrasonic motor having a piezoelectric device, the ultrasonic motor 5 comprising the two electrodes 5A and 5B as described above. That is, the electrodes 5A and 5B are arranged to receive the AC signals VA and VB. in the foregoing two phases (the phases A and B) which are deviated from each other by an angular degree of about 90°, the AC signals in the two phases rotating the ultrasonic motor 5.

Figure 2:
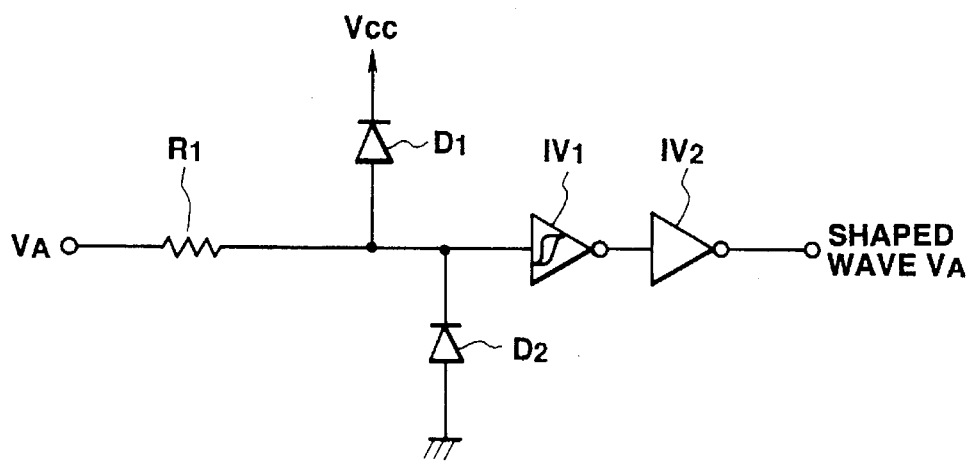
FIG. 2 is an electrical circuit diagram which illustrates the structure of a waveform shaping circuit of the circuit for rotating an ultrasonic motor according to the first embodiment.

The waveform shaping circuit 4, as shown in FIG. 2, comprises a resistor R1 for reducing an electric current, clamp diodes D1 and D2, an inverter $IV_1$ having a hysteresis and a conventional inverter IV2. The input terminal of the current reducing resistor R1 is connected to the output terminal of the transformer T1 so that the AC signal VA generated and transmitted from the transformer T1 is supplied to the waveform shaping circuit 4 as well as to the ultrasonic motor 5. The AC signal VA received by the waveform shaping circuit 4 is shaped by the clamp diodes D1 and D2 and then it is further shaped into a digital signal by the two inverters $IV_1$ and IV2. As a result, the digital signal is supplied to the phase comparator 3.

The operation of the first embodiment will now be described.

Figure 3:
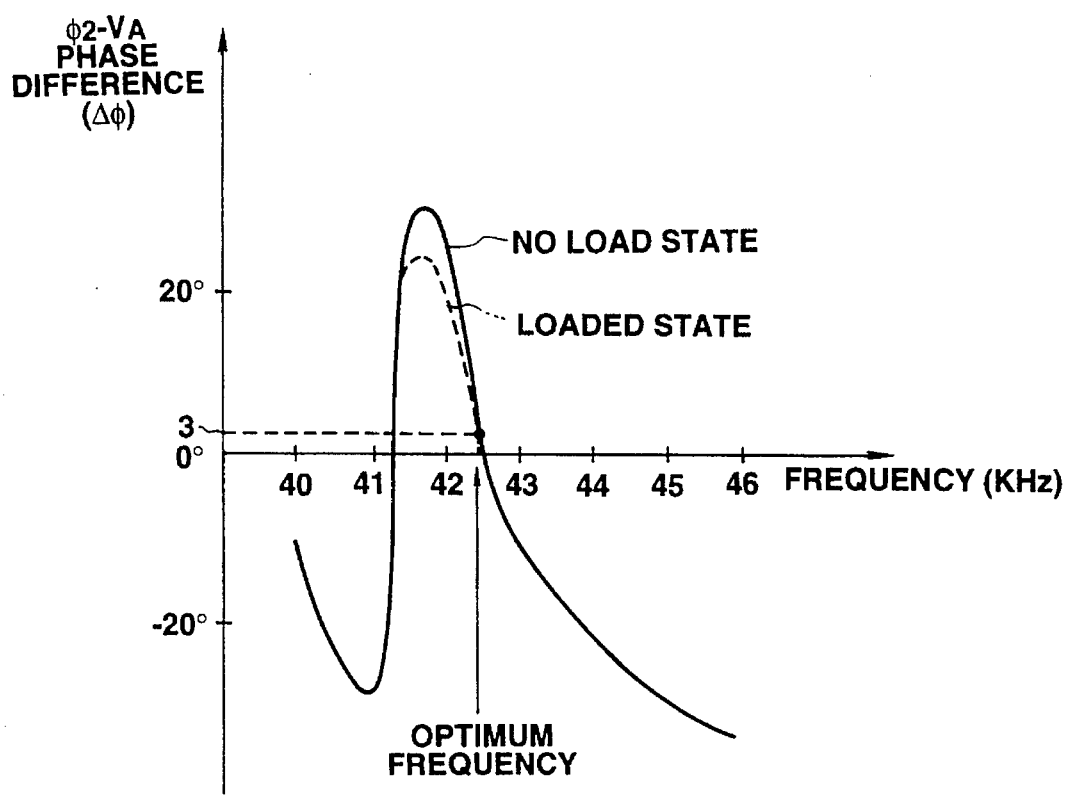
FIG. 3 is a graph which illustrates the relation between phase difference $\Delta\phi$ and the operation frequency assuming that the phase difference between the shaped waveform of AC signal VA and a pulse signal transmitted through one output port of a pulse conversion circuit is $\Delta\phi$.
Figure 4:
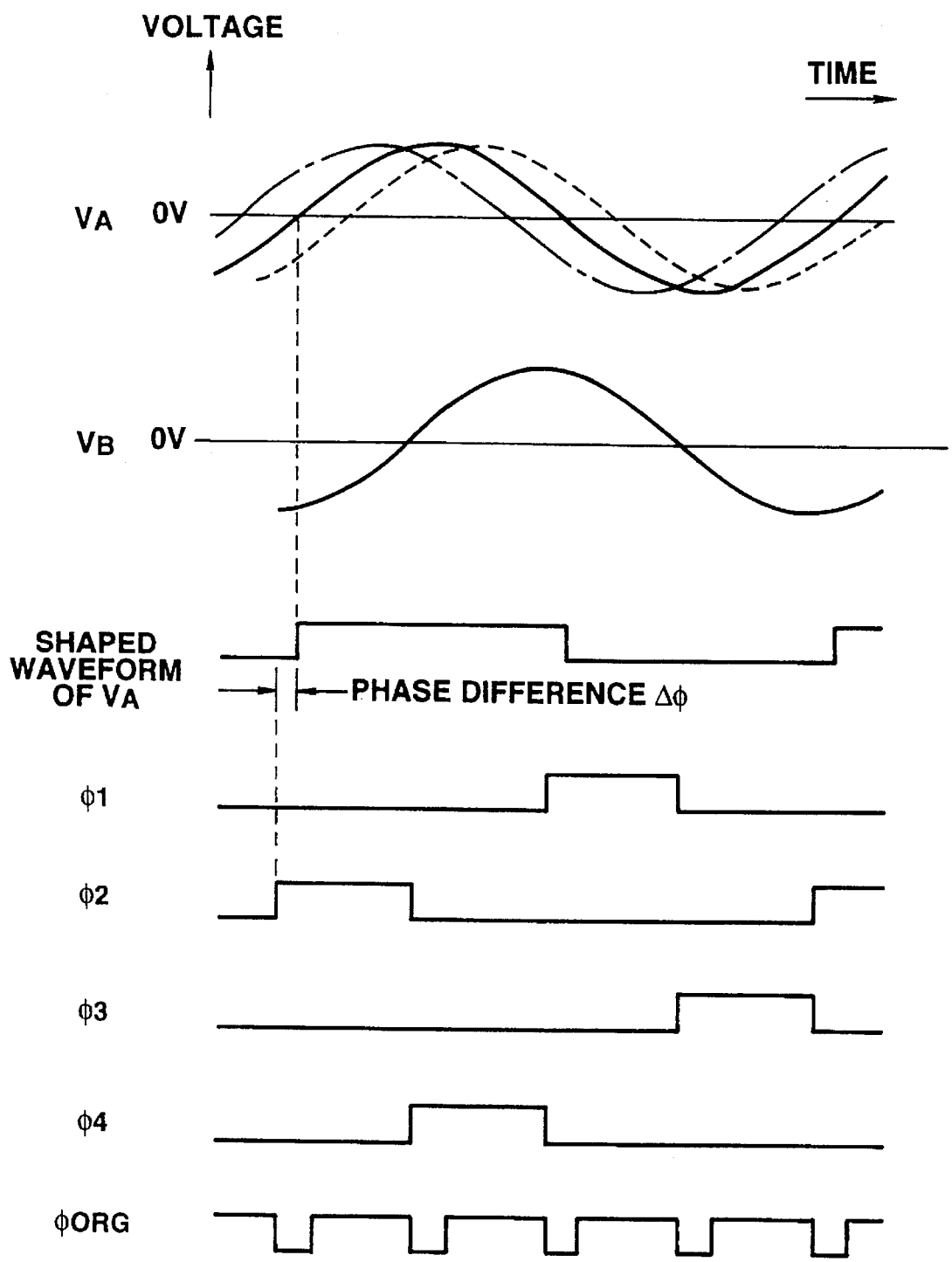
FIG. 4 is a timing chart which illustrates the relation among the AC signal VA, the shaped waveform of the AC signal VA and a pulse signal transmitted from a pulse conversion circuit of the ultrasonic motor according to the first embodiment.

In accordance with the results of measurement performed by the applicant of the present invention, assuming that the phase difference between the shaped waveform of the AC signal in the phase A and the pulse signal φ2 transmitted from the pulse conversion circuit 2 is Δφ as shown in FIG. 4, the phase difference Δφ and the operating frequency (which corresponds to the frequency of the AC signal in the phase A) have the relationship shown in FIG. 3. When the phase difference Δφ is adjusted to 3° by raising/lowering the operation frequency, the optimum operation frequency can be followed.

Specifically, the adjustment is performed in such a manner that the oscillation is commenced at 44 KHz, which is somewhat higher than the predicted optimum operation frequency for the oscillation circuit 1, and the operation frequency is gradually lowered while supervising the phase difference Δφ so that the phase difference Δφ is made to be 3°. That is, the oscillation frequency is changed so that the operation frequency is raised if the phase difference Δφ is larger than 3° and the same is lowered if the phase difference Δφ is smaller than 3°.

As a result of the foregoing operation, the optimum operation frequency of the ultrasonic motor, which has no monitor electrode and which encounters a considerable load change, can be followed.

According to the first embodiment, the foregoing waveform shaping circuit can be constituted by low cost elements. Further, the generation of the power loss of the AC signal VA in the phase A can substantially be prevented by enlarging the current reducing resistor R1. In addition, the foregoing signal process can significantly easily be performed since both of the AC signal VA in the phase A and the pulse signal φ2 are digital signals.

A second embodiment of the present invention will now be described.

Figure 5:
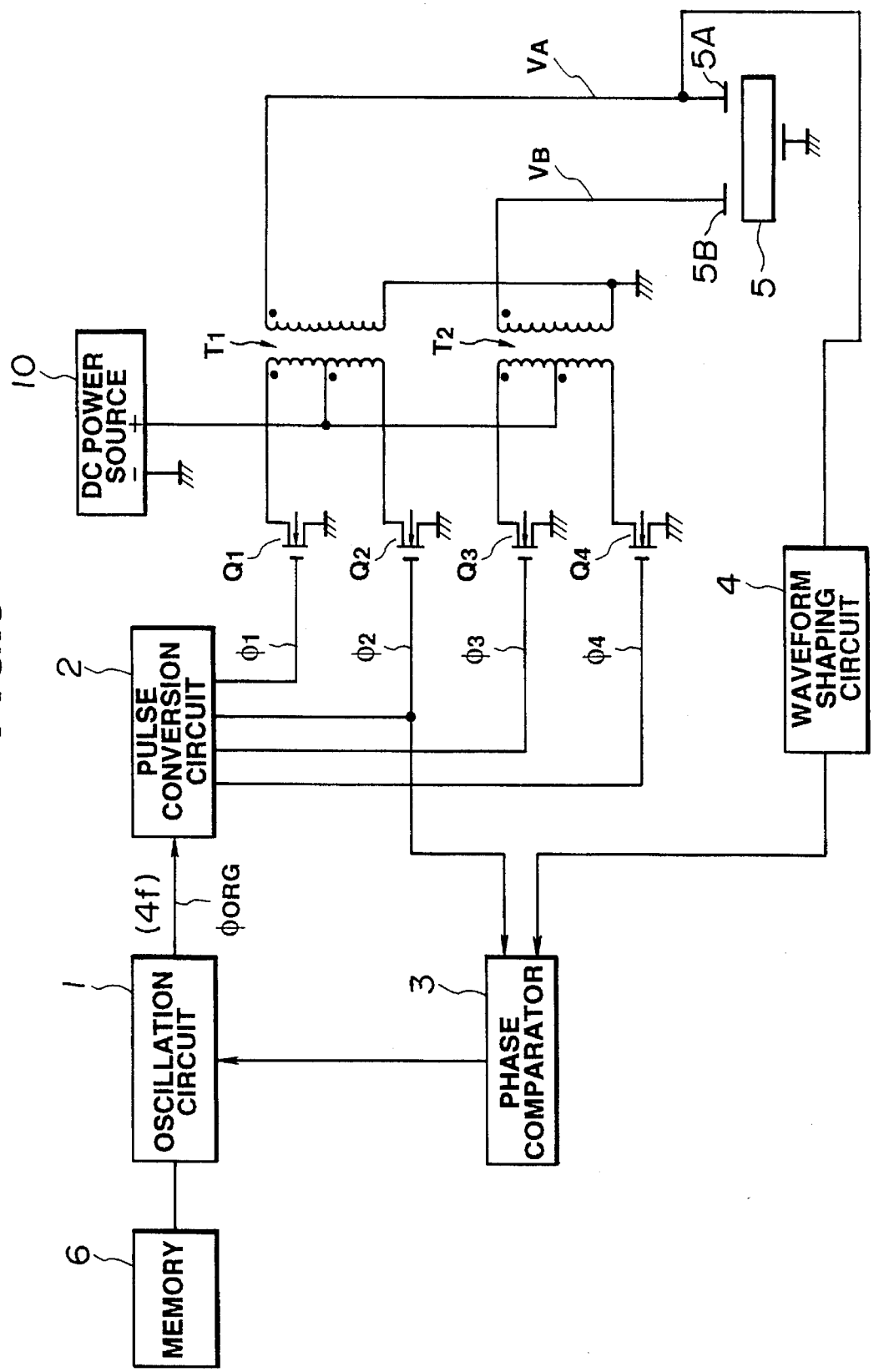
FIG. 5 is an electrical circuit diagram which illustrates a second embodiment of a circuit for rotating an ultrasonic motor according to the present invention.

FIG. 5 is an electrical circuit diagram which illustrates a circuit for rotating an ultrasonic motor according to the second embodiment.

The circuit for rotating an ultrasonic motor according to the second embodiment has substantially the same structure as that of the first embodiment. The difference from the first embodiment is that a memory 6 is added to the oscillation circuit 1.

The characteristics of the ultrasonic motor are delicately changed due to a dimension error or the like occurring during manufacturing. Accordingly, each of the ultrasonic motors has a peculiar optimum phase difference, namely the optimum phase difference Δφ between the shaped waveform of the AC signal VA in the phase A and the pulse signal φ2 transmitted from the pulse conversion circuit 2. The second embodiment has been established on the basis of the fact that each ultrasonic motor has a peculiar optimum phase difference. The second embodiment is arranged in such a manner that the optimum phase difference Δφ is stored in the memory 6 and the frequency control similar to that according to the first embodiment is performed.

According to the second embodiment, manufacturing errors of each ultrasonic motor can be corrected and the optimum operation frequency can be followed further accurately.

It should be noted that the second embodiment may be arranged in such a manner that a plurality of phase differences Δφ are stored in the memory 6 so as to be selectively used in accordance with the power supply voltage or the like.

The oscillation circuit 1 according to the first and second embodiments may be a VCO means or a digital division oscillation means. The pulse signals φto φ4 can be generated by using a phase deviating circuit or the like in place of using the frequency set four times the frequency of the two-phase AC signals. The waveform shaping circuit 4 may comprise a comparator or the like. The ultrasonic motor 5 may be any ultrasonic motor in place of the traveling-wave-type ultrasonic motor if it has the impedance, which can be changed due to frequency or the like, and the phase difference Δφ which can be changed.

As described above, each of the first and second embodiment enables a circuit for rotating an ultrasonic motor to be provided which is able to follow the optimum operation frequency and which cannot easily be affected by the load change even if it is adapted to a low cost ultrasonic motor having no monitor electrode.

Figure 7:
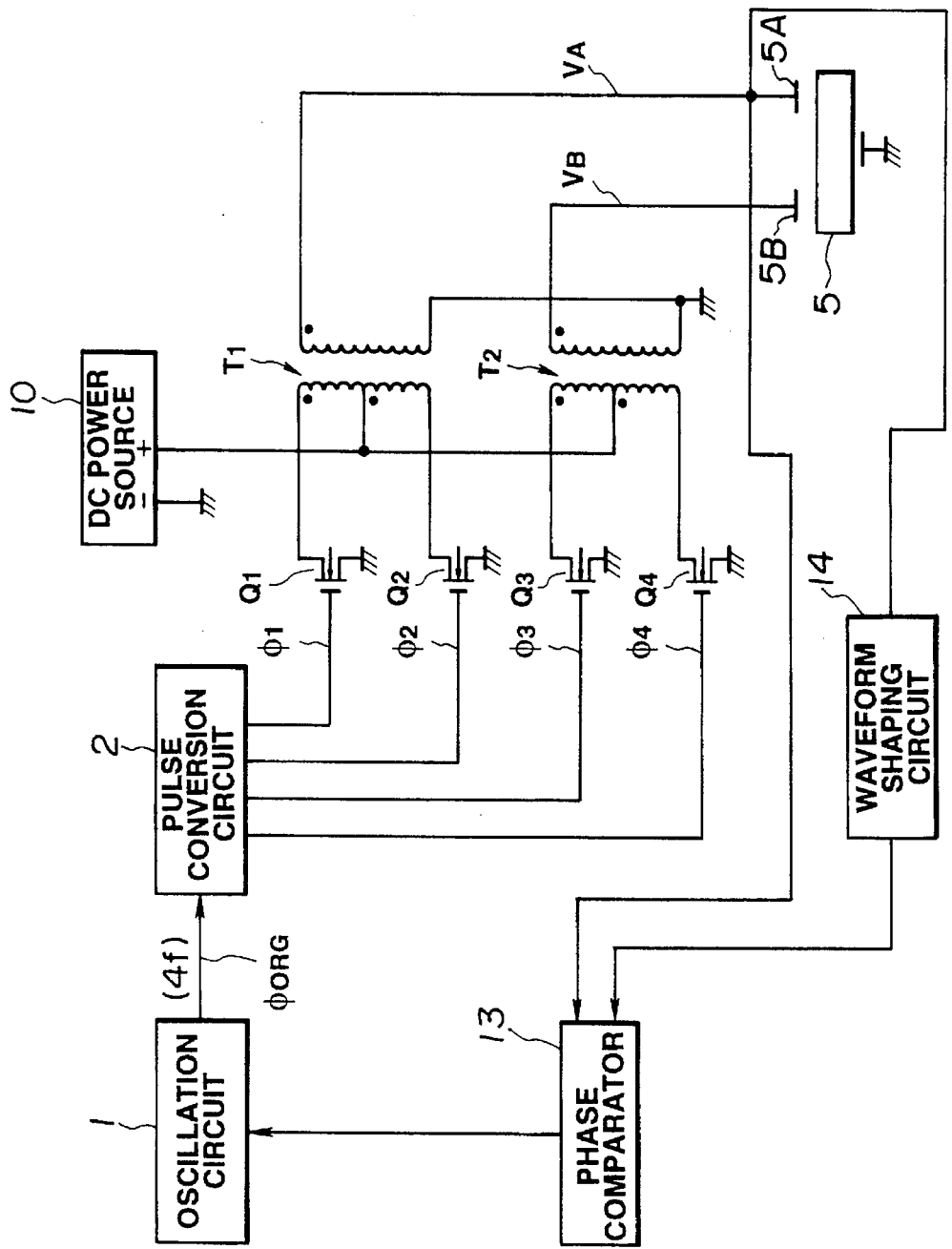
FIG. 7 is an electrical circuit diagram which illustrates a third embodiment of the circuit for rotating an ultrasonic motor according to the present invention.

A third embodiment of the present invention will now be described. FIG. 7 is an electrical circuit diagram of a circuit for rotating an ultrasonic motor according to the third embodiment.

The circuit for rotating an ultrasonic motor according to the third embodiment is, similar to the first embodiment, arranged in such a manner that a predetermined AC signal is supplied to a known ultrasonic motor 5 having two electrodes 5A and 5B, and the AC signal is monitored so as to control the rotations of the ultrasonic motor 5.

That is, the rotating circuit comprises an oscillation circuit 1 for generating and transmitting pulse signal φORG having a frequency which is about four times the frequency of the AC operation signal to be supplied to the ultrasonic motor 5. In addition, the rotating circuit includes a pulse conversion circuit 2 for dividing the pulse signal φORG transmitted from the foregoing oscillation circuit 1 into 4-phase pulse signals φ1 to φ4 to transmit them. Moreover, the rotating circuit comprises switching transistors Q1 to Q4 for performing switching operations to respectively correspond to the pulse signals φ1 to φ4 transmitted from the pulse conversion circuit 2. The rotating circuit further comprises a transformer T1 having an intermediate tap disposed on the primary side thereof to which positive voltage supplied from a DC power source 10 is supplied and arranged in such a manner that the primary side is turned on due to the switching operations of the switching transistors Q1 and Q2 and, therefore, AC signal VA in phase A is transmitted to the secondary side. In addition, the rotating circuit comprises a transformer T2 having an intermediate tap disposed on the primary side to which positive voltage from power source 10 is supplied so that the primary side is turned on due to the switching operations of the switching transistors Q3 and Q4 to transmit AC signal VB, in phase B to the secondary side thereof. The rotating circuit comprises a waveform shaping circuit 14 connected to an output end (on the side of the phase A) of the transformer T1 to convert the AC signal VA into a predetermined digital signal. In addition, the rotating circuit comprises a phase comparator 13 that receives the digital signal transmitted from the waveform shaping circuit 14 and the AC signal VA so as to subject the phases of the two signals to a comparison and transmit the result of the comparison, that is, the phase difference between the two signals, to the oscillation circuit 1. The foregoing circuits and devices form the main portion of the rotating circuit.

The oscillation circuit 1 subjects the phase of a predetermined optimum frequency and that of the output from the phase comparator 13, that is, the phase of the digital signal transmitted from the waveform shaping circuit 14 and the AC signal, to a comparison so as to control the transmitted oscillation frequency in accordance with the result of the comparison.

Figure 8:
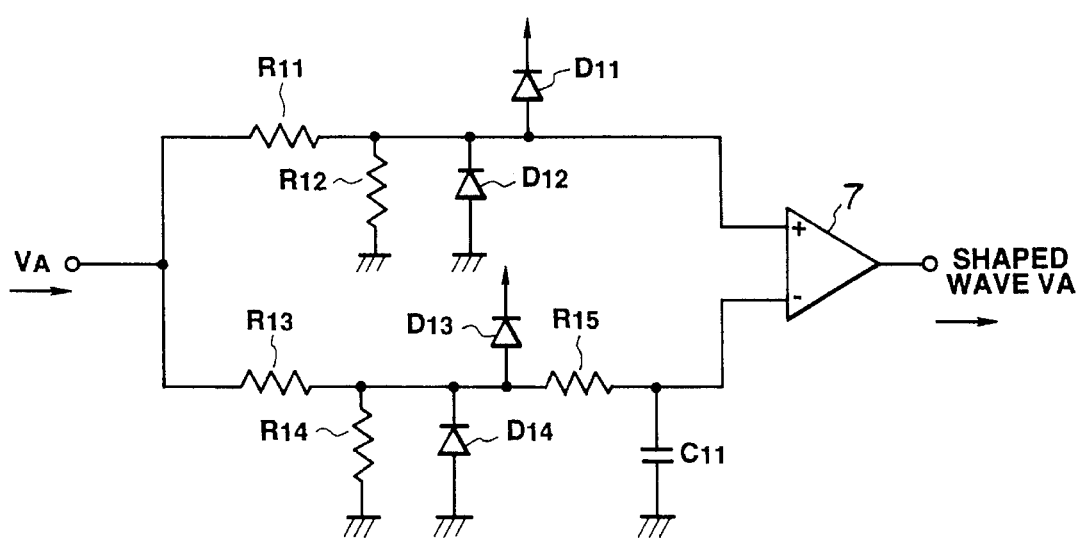
FIG. 8 is an electrical circuit diagram which illustrates the structure of a waveform shaping circuit of the circuit for rotating an ultrasonic motor according to the third embodiment.
Figure 9A:
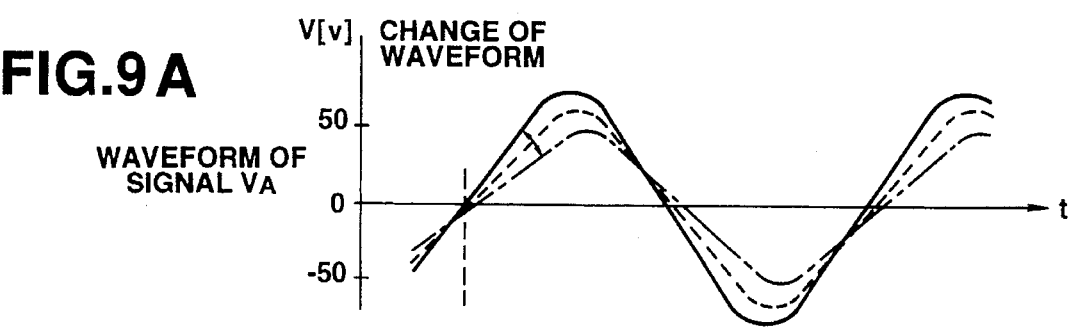
FIG. 9A is a graph which illustrates the waveform of the AC signal VA which is a signal supplied to the waveform shaping circuit of a circuit for rotating an ultrasonic motor according to the third embodiment.
Figure 9B:
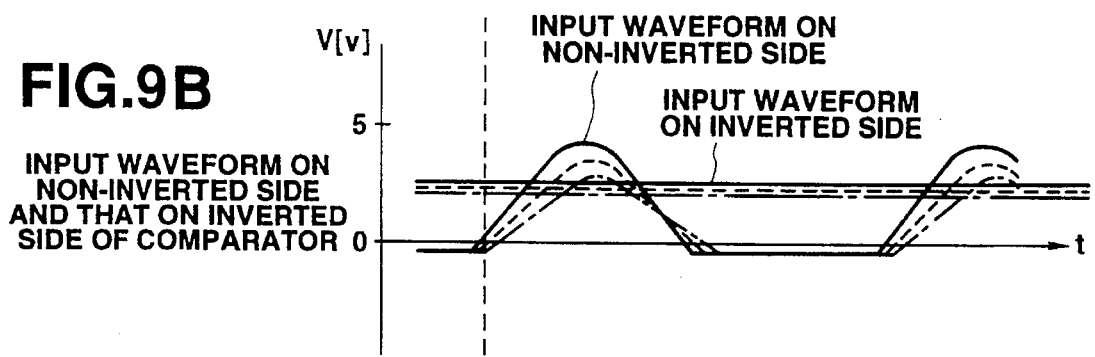
FIG. 9B is a graph which illustrates the input waveform on the inversion side of a comparator and that on the non-inversion side of the same of a waveform shaping circuit of the circuit for rotating an ultrasonic motor according to the third embodiment.
Figure 9C:
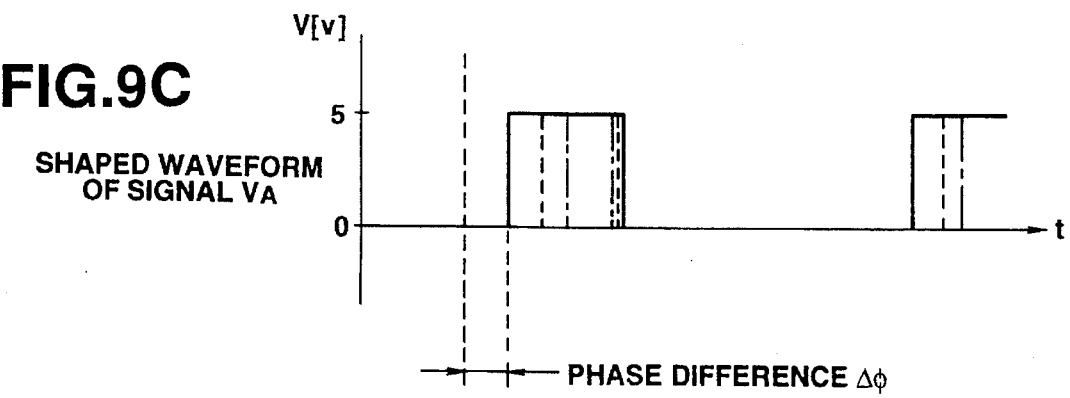
FIG. 9C is a graph which illustrates the shaped waveform of the AC signal which is an output signal from the waveform shaping circuit of the circuit for rotating an ultrasonic motor according to the third embodiment.

FIG. 8 is an electrical circuit diagram which illustrates the waveform shaping circuit 14 disposed in the circuit for rotating an ultrasonic motor according to the third embodiment of the present invention. FIG. 9A is a graph which illustrates the waveform of the AC signal VA which is a signal to be received by the waveform shaping circuit 14. FIG. 9B is a graph which illustrates the waveform of the signal received on the inverted-side of the comparator of the waveform shaping circuit 14 and that received on the non-inverted side of the same. FIG. 9C is a graph which illustrates the waveform of the AC signal VA which is a signal transmitted from the waveform shaping circuit 14.

The waveform shaping circuit 14, as shown in FIG. 8, comprises: a first circuit including resistors R11 and R12 for lowering the voltage levels and clamp diodes D11 and D12; a second circuit including resistors R13 and R14 for lowering the voltage levels, clamp diodes D13 and D14 and an integrating circuit having a resistor R15 and a capacitor C11; and a comparator 7 for causing the signal transmitted from the first circuit to be received by the non-inversion input terminal and causing the signal transmitted from the second circuit to be received by the inversion input terminal.

The resistors R11 and R13 for lowering the voltage levels have input terminals connected to the output terminal of the transformer T1 so that the AC signal VA transmitted from the transformer T1 is received by the first and second circuits.

The AC signal VA (see FIG. 9A) received by the two circuits is decayed by the resistors R13 and R14, shaped by the clamp diodes D13 and D14, smoothed by the integrating circuit comprising the resistor R15 and the capacitor C11, and then supplied, as a threshold level, to the inversion input terminal of the comparator 7 (see FIG. 9B). It should be noted that the values of the resistors R13 and R14 are set to include the top portion of the waveform of the AC signal VA in a voltage range shaped by the clamp diodes D13 and D14.

On the other hand, the AC signal VA received by the first circuit is decayed by the resistors R11 and R12, shaped by the clamp diodes D11 and D12, and received by the non-inversion input terminal of the comparator 7 (see FIG. 9B). It should be noted that the values of the resistors R11 and R12 are set so that the position of the waveform of the AC signal VA, at which the waveform is changed most intensely, coincides with the foregoing threshold level position in the voltage range realized by the clamp diodes D11 and D12.

As a result of the foregoing structure, the waveform of the AC signal VA is shaped into a digital waveform at a predetermined threshold level ratio (see FIG. 9C) so as to be transmitted to the phase comparator 13.

The operation of the third embodiment will now be described.

Figure 10:
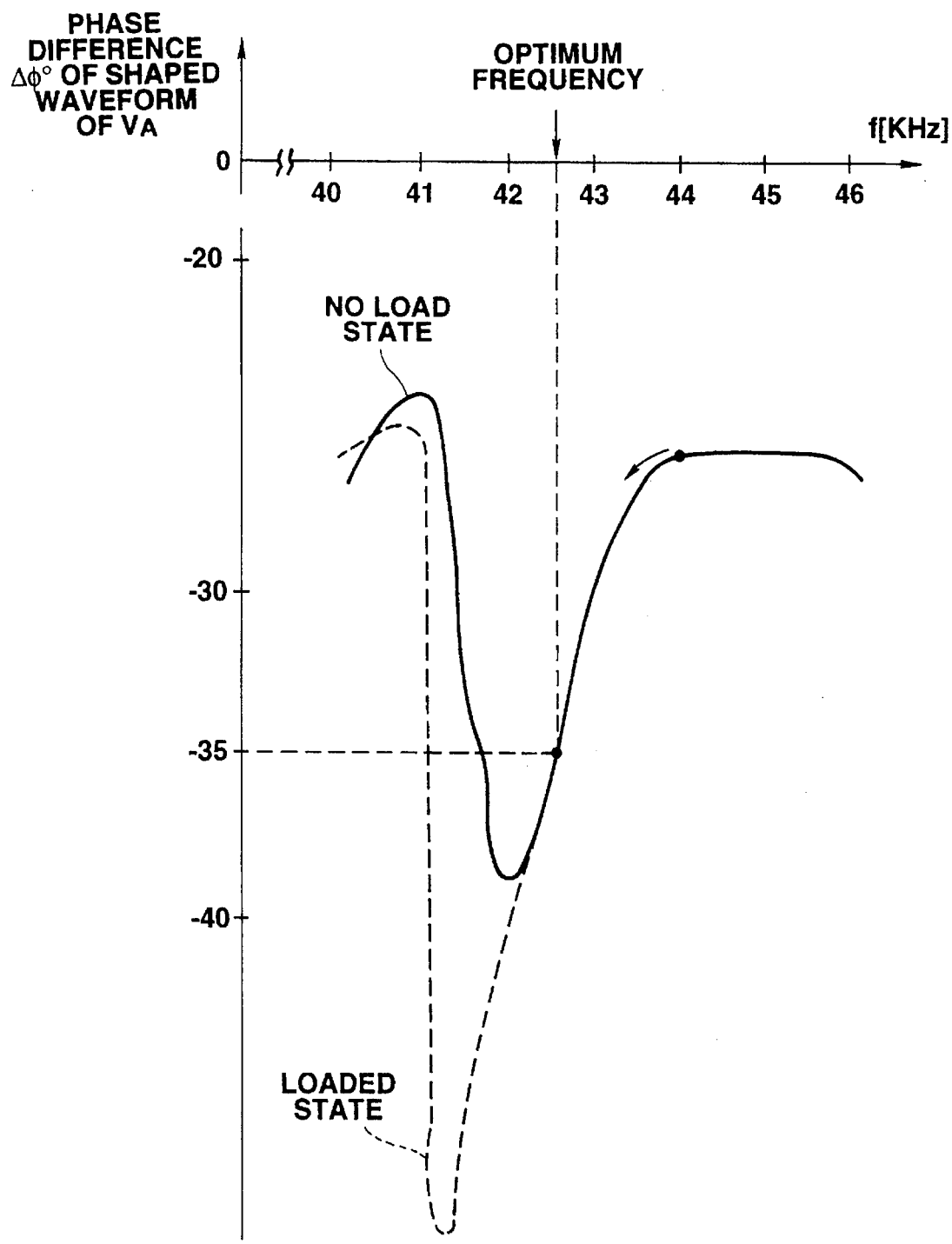
FIG. 10 is a graph which illustrates the relation realized in the circuit for rotating an ultrasonic motor according to the third embodiment among the phase difference between the AC signal VA and the shaped waveform of the AC signal and the operation frequency.

FIG. 10 is a graph which illustrates the relation between the difference between the phase of the AC signal VA, the phase of the shaped waveform of the AC signal VA and the phase of the operation frequency of the AC signal VA realized in the circuit for rotating the ultrasonic motor according to the third embodiment.

Assuming that the difference between the AC signal VA in the phase A and that of the shaped waveform of the AC signal VA is Δφ, the optimum operation frequency can be followed by raising/lowering the operation frequency to maintain the phase difference Δφ at a predetermined value. It should be noted that the phase difference Δφ is expressed by:

(the shaped waveform)−(AC signal VA).

Specifically, the oscillation is commenced at 44 KHz, which is somewhat higher than the predicted optimum operation frequency for the oscillation circuit 1, and the operation frequency is gradually lowered while supervising the phase difference $\Delta\phi$ in accordance with the output from the phase comparator 13. Then, adjustment is performed so that the phase difference $\Delta\phi$ is made to be the phase difference, which corresponds to a predetermined optimum operation frequency, that is, $-35°$ for example. That is, if the absolute value of the phase difference $\Delta\phi$ is larger than $-35°$, the oscillation frequency is changed to raise the operation frequency. If the same is smaller than $-35°$, the oscillation frequency is changed to lower the operation frequency.

As a result of the foregoing operation, the optimum operation frequency of the ultrasonic motor, which has no monitor electrode, can be followed. By utilizing the characteristic portion, the change of which is limited between the non-loaded state and the loaded state, the optimum operation frequency for an ultrasonic motor that encounters a great load change can be followed.

According to the third embodiment, the waveform shaping circuit can be formed by low cost elements. By enlarging the voltage lowering resistors R11 and R13, power loss of the AC signal in the phase A can substantially be prevented.

A fourth embodiment of the present invention will now be described.

Figure 11:
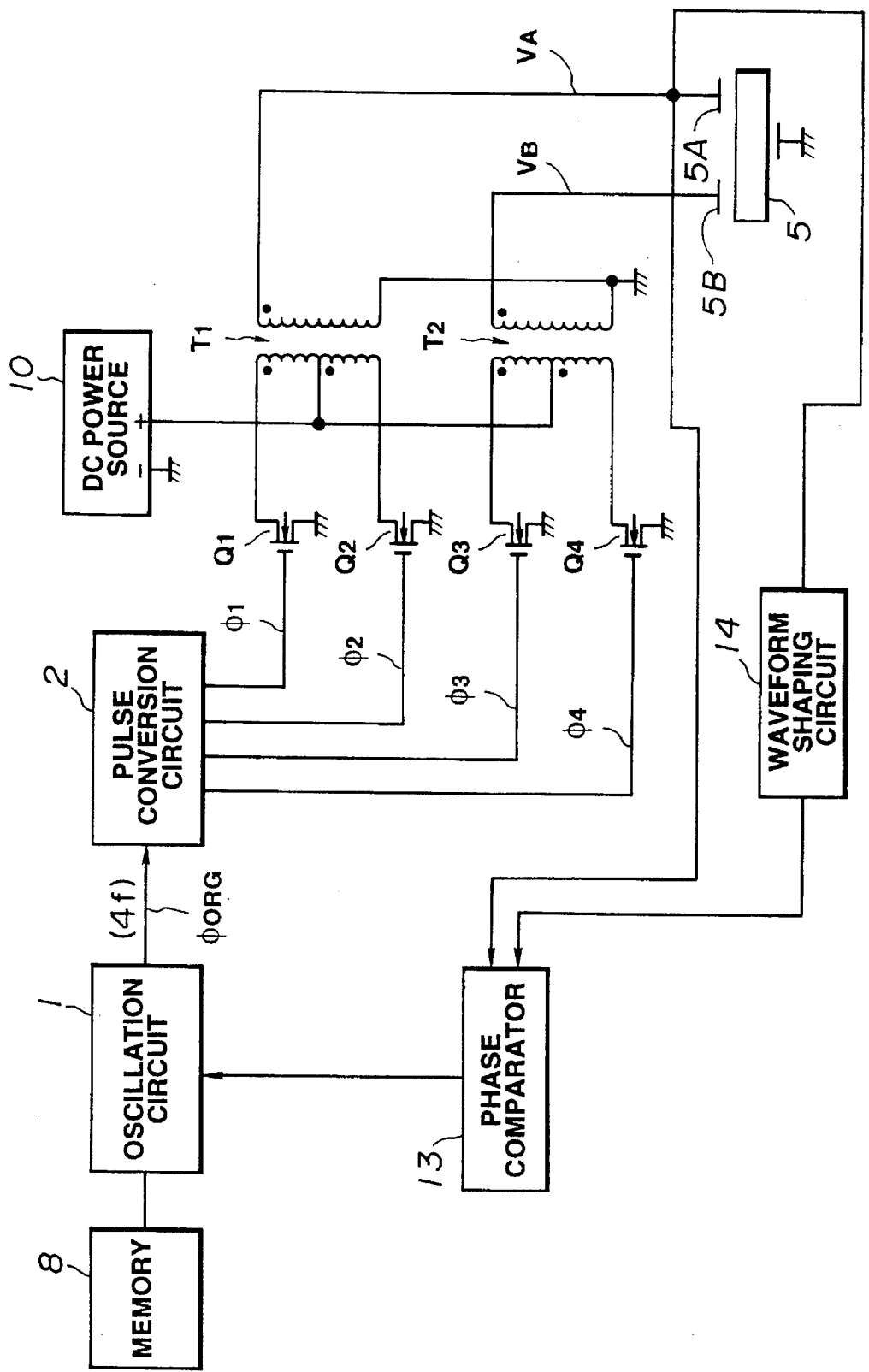
FIG. 11 is an electrical circuit diagram which illustrates a fourth embodiment of the circuit for rotating an ultrasonic motor according to the present invention.

FIG. 11 is an electrical circuit diagram which illustrates a circuit for rotating an ultrasonic motor according to the fourth embodiment of the. The circuit for rotating an ultrasonic motor according to the fourth embodiment is arranged similar to the third embodiment except for an arrangement in which a memory 8 is added to the oscillation circuit 1. The foregoing arrangement is the same as the relation between the first embodiment and the second embodiment. That is, the fourth embodiment is established on the basis of the fact that each ultrasonic motor has a peculiar optimum phase difference, the fourth embodiment being arranged in such a manner that the optimum phase difference $\Delta\phi$ is stored in the memory 8 and the frequency control similar to that according to the third embodiment is performed.

According to the fourth embodiment, the manufacturing error occurring in each ultrasonic motor can be corrected and the optimum operation frequency can be performed further accurately. Also the fourth embodiment may be arranged such that a plurality of phase differences $\Delta\phi$ are stored in the memory 8 so as to be selectively used in accordance with the power supply voltage or the like.

Although the third and fourth embodiments are arranged in such a manner that the control of the optimum operation frequency is performed in accordance with the difference between the phase of the AC signal in the phase A and the phase of the shaped waveform of the AC signal, the difference between the phase of AC signal $VB_1$ in phase B and that of the waveform of the AC signal $VB_1$ or between the phase of AC signals in the two phases and that of the waveform of the AC signals may be used.

Also in the third embodiment or the fourth embodiment, the oscillation circuit 1 may be a VCO means or a digital division oscillation means similar to the first and second embodiments. The pulse signals $\phi1$ to $\phi4$ can be generated by using a phase deviating circuit or the like in place of using the frequency set to four times the frequency of the two-phase AC signals. The ultrasonic motor 5 may be any ultrasonic motor in place of the traveling-wave-type ultrasonic motor if it has the impedance, which can be changed due to frequency or the like, and the phase difference $\Delta\phi$ which can be changed.

A fifth embodiment of the present invention will now be described.

Figure 12:
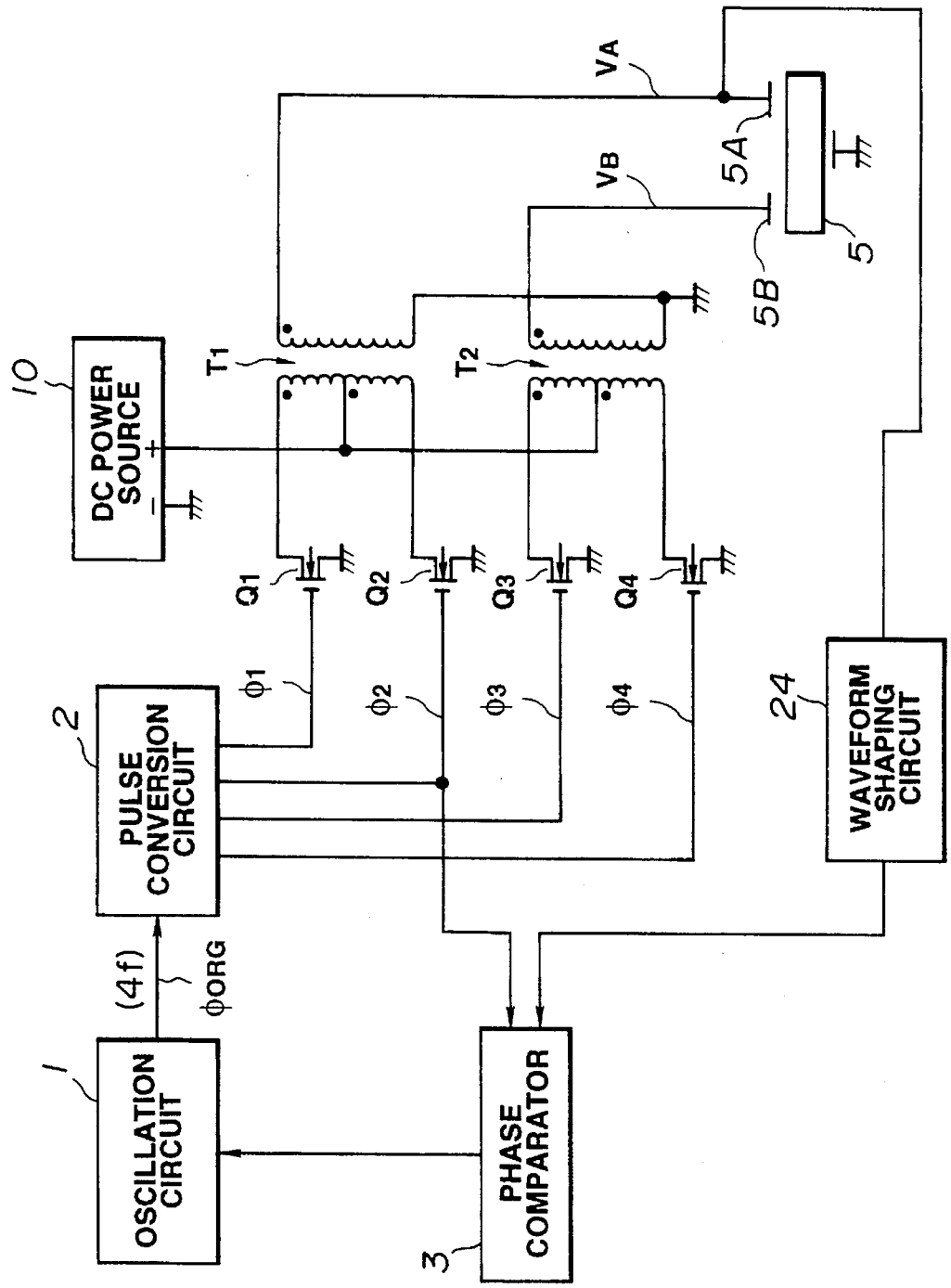
FIG. 12 is an electrical circuit diagram which illustrates a fifth embodiment of the circuit for rotating an ultrasonic motor according to the present invention.

FIG. 12 is an electrical circuit diagram which illustrates a circuit for rotating an ultrasonic motor according to the fifth embodiment. The fifth embodiment has a structure similar to the first embodiment except for the structure of the waveform shaping circuit. The structure of this embodiment will now be described.

The circuit for rotating an ultrasonic motor according to the fifth embodiment is, similar to the first embodiment, arranged such that a predetermined two-phase AC signal is supplied to the known ultrasonic motor 5 having the two electrodes 5A and 5B, and the AC signal is monitored so that the operation of the ultrasonic motor 5 is controlled.

Namely, the rotating circuit comprises an oscillation circuit 1 for generating and transmitting pulse signal $\phi ORG$ having a frequency which is about four times that the AC operation signal to be supplied to the ultrasonic motor 5. In addition, the rotating circuit includes a pulse conversion circuit 2 for dividing the pulse signal $\phi ORG$ transmitted from the foregoing oscillation circuit 1 into 4-phase pulse signals $\phi1$ to $\phi4$ to transmit them. Moreover, the rotating circuit comprises switching transistors Q1 to Q4 for performing switching operations to respectively correspond to the pulse signals $\phi1$ to $\phi4$ transmitted from the pulse conversion circuit 2. The rotating circuit further comprises a transformer T1 having an intermediate tap disposed on the primary side thereof to which positive voltage supplied from a DC power source 10 is supplied and arranged in such a manner that the primary side is turned on due to the switching operations of the switching transistors Q1 and Q2 and, therefore, AC signal VA in phase A is transmitted to the secondary side. In addition, the rotating circuit comprises a transformer T2 having the primary side which is turned on due to the switching operations of the switching transistors Q3 and Q4 to transmit AC signal $VB_1$ in phase B to the secondary side thereof. The rotating circuit comprises a waveform shaping circuit 24 connected to an output end (on the side of the phase A) of the transformer T1 to convert the AC signal VA into a predetermined digital signal. In addition, the rotating circuit comprises a phase comparator 3 that receives the digital signal transmitted from the waveform shaping circuit 24 and the pulse signal $\phi2$ supplied from the pulse conversion circuit 2 so as to subject the phases of the two signals to a comparison and transmit the result of the comparison, that is, the phase difference between the two signals to the oscillation circuit 1. The foregoing circuits and devices form the main portion of the rotating circuit.

The oscillation circuit 1 subjects the phase of a predetermined optimum frequency and that of an output from the phase comparator 3, that is, the phase of the digital signal transmitted from the waveform shaping circuit 24 and that of the pulse signal $\phi2$, to a comparison, the oscillation circuit 1 being arranged to control the oscillation frequency to be transmitted in accordance with the result of the comparison.

Figure 13:
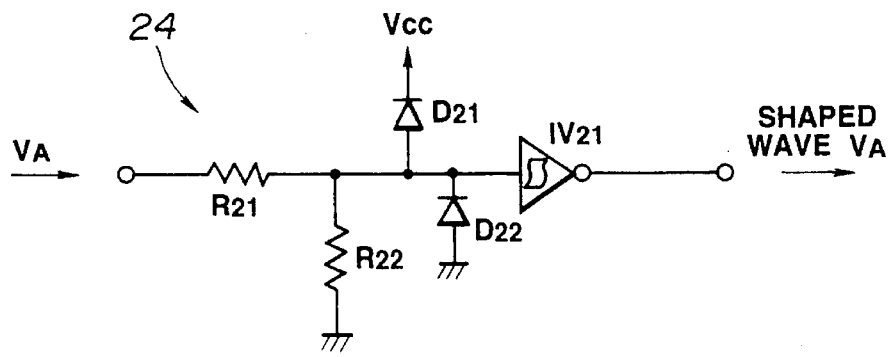
FIG. 13 is an electrical circuit diagram which illustrates the structure of a waveform shaping circuit of the circuit for rotating an ultrasonic motor according to the fifth embodiment of the present invention.
Figure 14A:
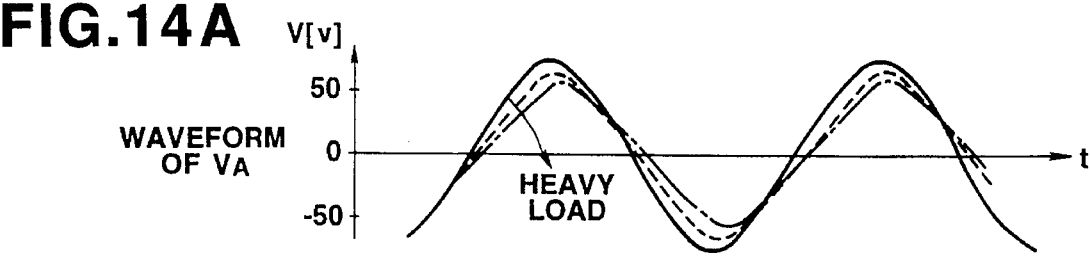
FIG. 14A is a graph which illustrates the waveform of the AC signal VA in the circuit for rotating an ultrasonic motor according to the fifth embodiment of the present invention.
Figure 14B:
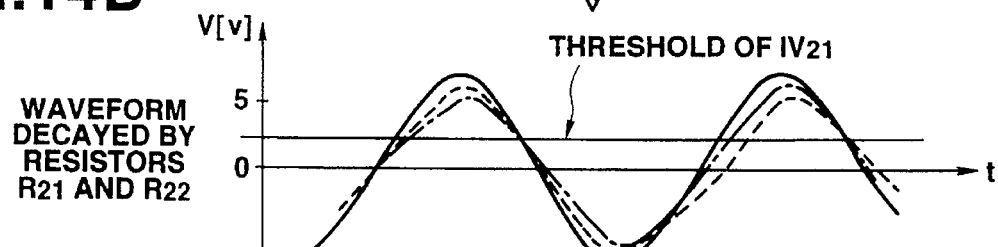
FIG. 14B is a graph which illustrates the decayed waveform realized by a current reducing resistor in the circuit for rotating an ultrasonic motor according to the fifth embodiment of the present invention.
Figure 14C:
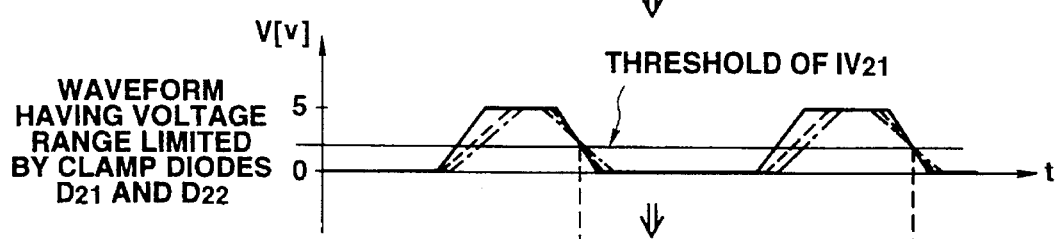
FIG. 14C is a graph which illustrates the waveform, the voltage range of which is limited by a clamp diode in the circuit for rotating an ultrasonic motor according to the fifth embodiment of the present invention.
Figure 14D:
FIG. 14D is a graph which illustrates the shaped waveform of the AC signal VA in the circuit for rotating an ultrasonic motor according to the fifth embodiment of the present invention.
Figure 14E:
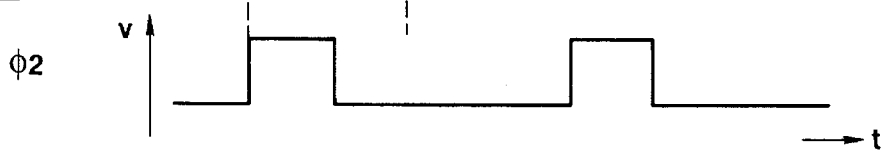
FIG. 14E is a graph which illustrates a pulse signal transmitted from one output port of a pulse conversion circuit of the circuit for rotating an ultrasonic motor according to the fifth embodiment of the present invention.

FIG. 13 is an electrical circuit diagram which illustrates the detailed structure of the waveform shaping circuit 24 of the circuit for rotating an ultrasonic motor according to the fifth embodiment. FIG. 14A is a graph which illustrates the waveform of the AC signal VA which is a signal received by the waveform shaping circuit 24. FIG. 14B is a graph which illustrates the waveform decayed due to the voltage lowering resistor in the waveform shaping circuit 24. FIG. 14C is a graph which illustrates the waveform realized when the voltage range has been limited by the clamp diode of the waveform shaping circuit 24. FIG. 14D is a graph which illustrates the shaped waveform of the AC signal VA which is a signal transmitted from the waveform shaping circuit 24. FIG. 14E is a graph which illustrates the waveform of the pulse signal φ2 which corresponds to each signal in the waveform shaping circuit 24.

Among the waveforms shown in FIGS. 14A, 14B, 14C, 14D and 14E, the waveforms designated by dashed lines represent waveforms realized from the state of waveforms designed by continuous lines when the ultrasonic motor is applied with a predetermined load. The waveforms designated by alternate long and short dash lines represent waveforms realized when the ultrasonic motor is further applied with a load.

The waveform shaping circuit 24, as shown in FIG. 13, comprises resistors R21 and R22 for lowering voltage levels, clamp diodes D21 and D22 and an inverter IV21 having hysteresis. The resistor R21 for lowering the voltage level has an input terminal connected to the output terminal of the transformer T1. As a result, the AC signal VA generated and transmitted from the transformer T1 is supplied to the ultrasonic motor 5 and also supplied to the waveform shaping circuit 24.

The AC signal VA (see FIG. 14A) received by the waveform shaping circuit 24 is subjected to a voltage lowering process in the resistors R21 and R22 for lowering the voltage (see FIG. 14B), shaped by the clamp diodes D21 and D22 so as to be limited to a predetermined voltage range in accordance with the values of the diodes D21 and D22 (see FIG. 14C), and shaped to a digital signal with a predetermined threshold level of the inverter IV21 so as to be supplied to the phase comparator 3 while being formed into a shaped waveform (see FIG. 14D).

Figure 15:
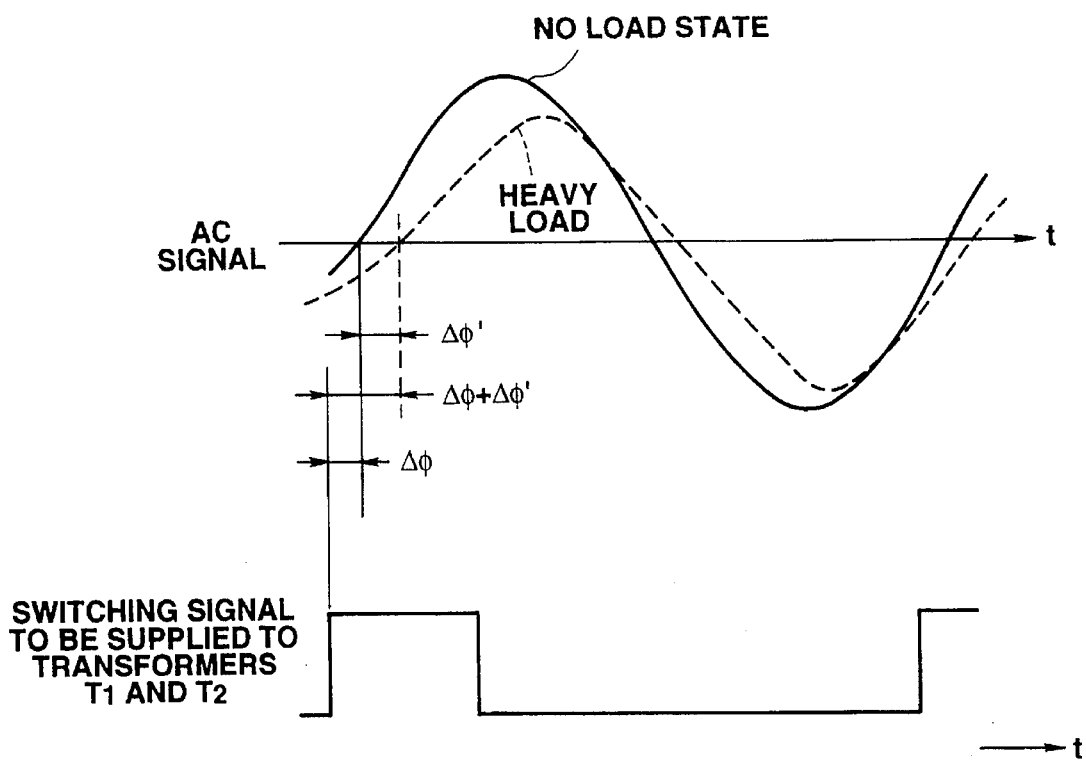
FIG. 15 is a graph which illustrates an example of the waveform of an AC signal to be supplied to a conventional ultrasonic motor if a heavy load is generated in the conventional ultrasonic motor.

If a considerably heavy load is applied to the ultrasonic motor, the waveform of the AC signal for rotating the ultrasonic motor is changed as shown in FIG. 15. Assuming that the phase difference between the first transition of the switching signal to be supplied to the transformers T1 and T2 and the AC signal to be supplied to the ultrasonic motor is $\Delta\phi$, the phase is undesirably deviated in a quantity of $\Delta\phi'$ as illustrated between the heavy load state and the non-load state. In the foregoing case, it might be considered that there arises a difficulty in accurately following the optimum operation frequency.

In contrast with this, the fifth embodiment is arranged so as to minimize the change in the waveform of the AC signal VA due to the load change at a predetermined threshold level for the inverter IV21 as shown in FIGS. 14A, 14B, 14C, 14D and 14E by setting the values of the resistors R21 and R22 for lowering the voltage levels to control the voltage level of the AC signal VA. As a result, the phase difference $\Delta\phi$ between the shaped waveform (see FIG. 14D) of the AC signal VA transmitted from the waveform shaping circuit 24 and the pulse signal φ2 (see FIG. 14E) cannot easily be affected over a considerably wide range by the change in the waveform of the AC signal VA taken place due to the load.

The operation of the fifth embodiment of the present invention will now be described.

Figure 16:
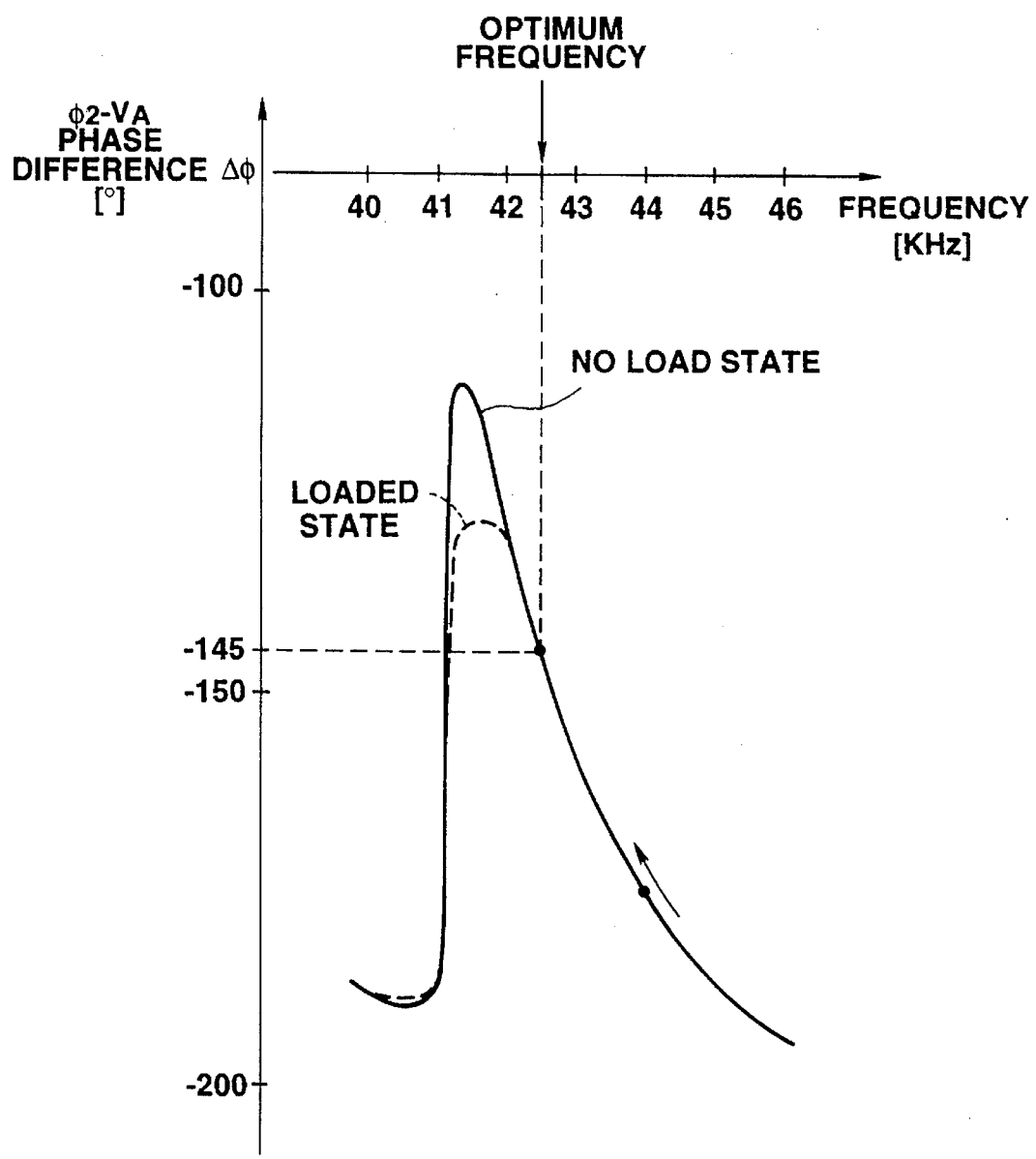
FIG. 16 is a graph which illustrates the relation between the phase difference $\Delta\phi$ and the waveform of the operation frequency realized in the circuit for rotating an ultrasonic motor according to the fifth embodiment of the present invention assuming that the phase difference between the shaped waveform of the AC signal VA and the pulse signal transmitted from one output of the pulse conversion circuit is $\Delta\phi$.

FIG. 16 is a graph which illustrates the relation among the phase difference between the AC signal VA and the pulse signal φ2, which is an output signal from the pulse conversion circuit 2, and the operation frequency of the AC signal VA.

Figure 6:
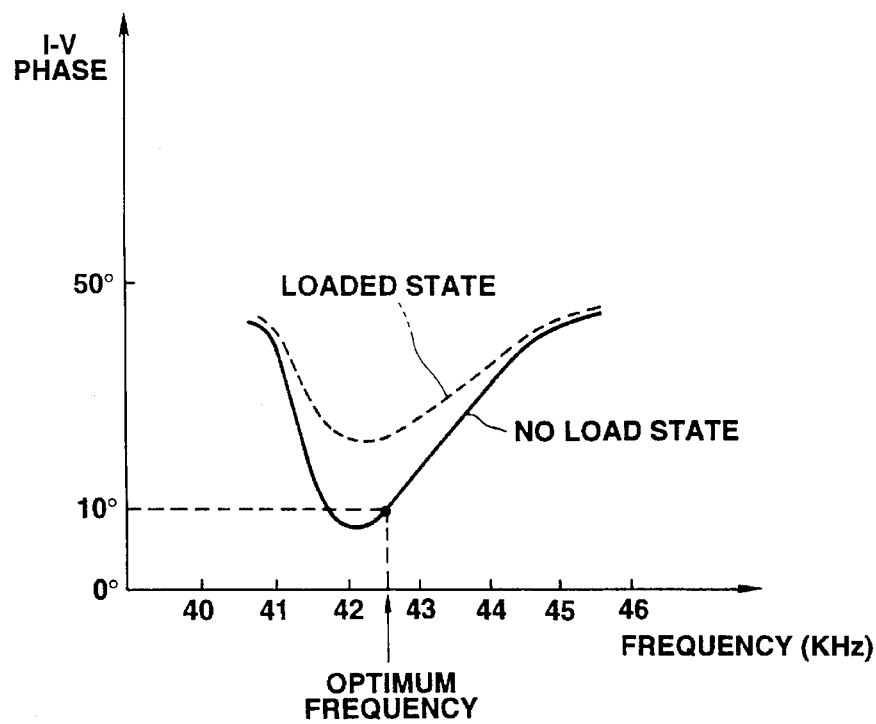
FIG. 6 is a graph which illustrates the relation realized in a conventional ultrasonic motor of the phase difference between an electric current and a voltage level of an operation signal and the operation frequency in a loaded state and a non-loaded state.

Assuming that the phase difference between the AC signal in the phase A and the pulse signal φ2 is $\Delta\phi$ as shown in FIG. 6, adjustment is performed so that the phase difference $\Delta\phi$ is maintained at a predetermined value by raising/lowering the operation frequency enabling the optimum operation frequency to be followed. It should be noted that the phase difference $\Delta\phi$ is, in the graph, expressed by:

(pulse signal φ2)–(AC signal VA).

Specifically, the oscillation is commenced at 44 KHz, which is somewhat higher than a predicted optimum operation frequency, and the operation frequency is gradually lowered in such a manner that the phase difference $\Delta\phi$ is supervised in accordance with the output from the phase comparator 3. Then, adjustment is performed so as to make the phase difference $\Delta\phi$ to be a phase difference, for example, –145°, which corresponds to a predetermined optimum operation frequency. That is, if the phase difference $\Delta\phi$ is larger than –145°, the operation frequency is raised. If the same is smaller than –145°, the operation frequency is lowered. Further, this embodiment is arranged in such a manner that the phase difference characteristic of the loaded state is not different from the phase characteristic of the non-loaded state in the vicinity of the phase difference of –145°.

As a result of the foregoing operation, the optimum operation frequency for an ultrasonic motor which encounters a considerable load change can be followed.

According to the fifth embodiment, the waveform shaping circuit can be constituted by low cost elements similar to each of the foregoing embodiments. By enlarging the resistor R21 for lowering the voltage level, power loss of the AC signal in the phase A can substantially be prevented.

By making the threshold level for the waveform shaping circuit 24 to be a value with which the change in the waveform occurring due to the load cannot take place and by extracting the change in the phase difference occurring due to the change in the electric characteristics of the ultrasonic motor, an influence of great change in the load, with which the waveform of the AC signal for rotating the ultrasonic motor can be changed, can be eliminated. Therefore, the optimum operation frequency can be followed further accurately.

A sixth embodiment of the present invention will now be described.

Figure 17:
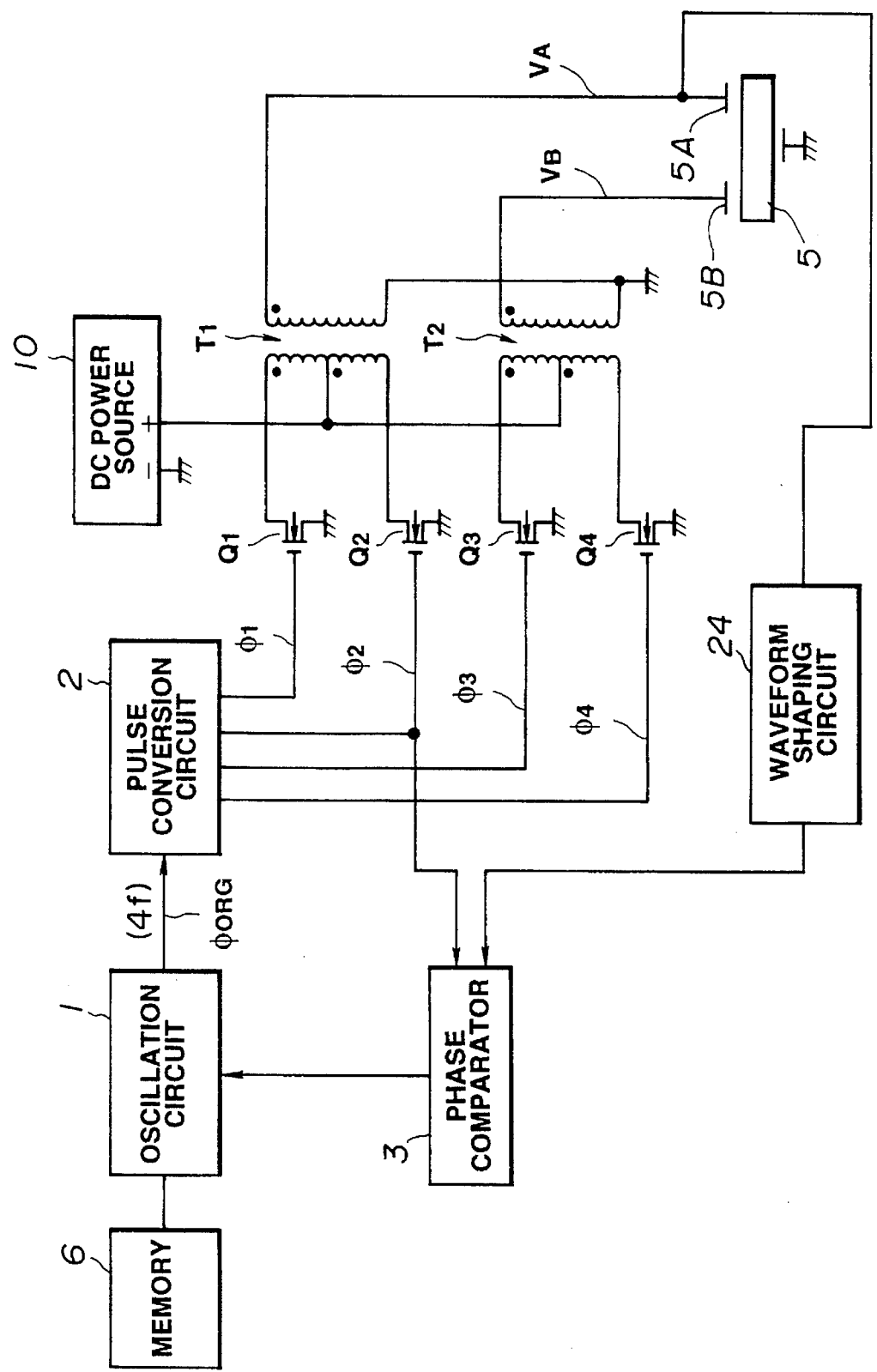
FIG. 17 is an electrical circuit diagram which illustrates a sixth embodiment of the circuit for rotating an ultrasonic motor according to the present invention.

FIG. 17 is an electrical circuit diagram which illustrates a circuit for rotating an ultrasonic motor according to the sixth embodiment. The circuit for rotating an ultrasonic motor according to the sixth embodiment is arranged similar to the fifth embodiment except for an arrangement in which a memory 6 is added to the oscillation circuit 1. The foregoing arrangement is the same as the relation between the first embodiment and the second embodiment. That is, the sixth embodiment is established on the basis of the fact that each ultrasonic motor has a peculiar optimum phase difference, the fourth embodiment being arranged in such a manner that the optimum phase difference $\Delta\phi$ is stored in the memory 6 and the frequency control similar to that according to the fifth embodiment is performed.

According to the sixth embodiment, the manufacturing error occurring in each ultrasonic motor can be corrected and the optimum operation frequency can be performed further accurately similar to the second and fourth embodiments.

The sixth embodiment may be arranged in such a manner that a plurality of phase differences $\Delta\phi$ are stored in the memory 6 so as to be selectively used in accordance with the power supply voltage or the like.

Although the fifth and sixth embodiments are, similar to the third and fourth embodiments, arranged in such a manner that the optimum operation frequency is controlled in accordance with the phase difference between the AC signal VA in the phase A and the shaped waveform of the AC signal VA, it is permissible to employ the phase difference between the AC signal VB in the phase B and the shaped waveform of the same or among the AC signals in the two phases and shaped waveforms of the AC signals.

Also the oscillation circuit 1 according to the fifth and sixth embodiments may be a VCO means or a digital division oscillation means. The pulse signals $\phi 1$ to $\phi 4$ can be generated by using a phase deviating circuit or the like in place of using the frequency set to the four times the frequency of the two-phase AC signals. The waveform shaping circuit 4 may comprise a comparator or the like. The ultrasonic motor 5 may be any ultrasonic motor in place of the traveling-wave-type ultrasonic motor if it has the impedance, which can be changed due to frequency or the like, and the phase difference $\Delta\phi$ which can be changed.

Figure 18:
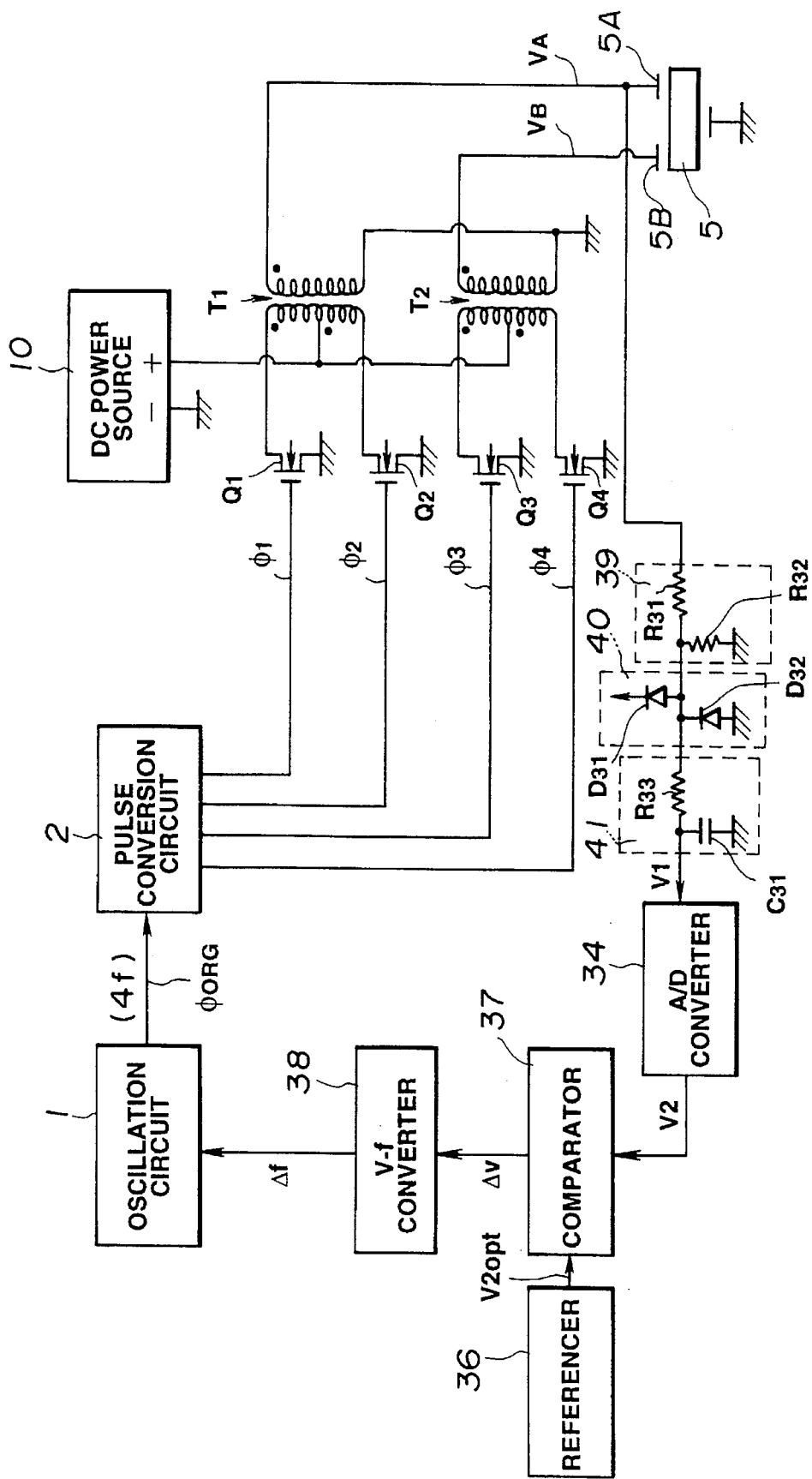
FIG. 18 is an electrical circuit diagram which illustrates a seventh embodiment of the circuit for rotating an ultrasonic motor according to the present invention.
Figure 19A:
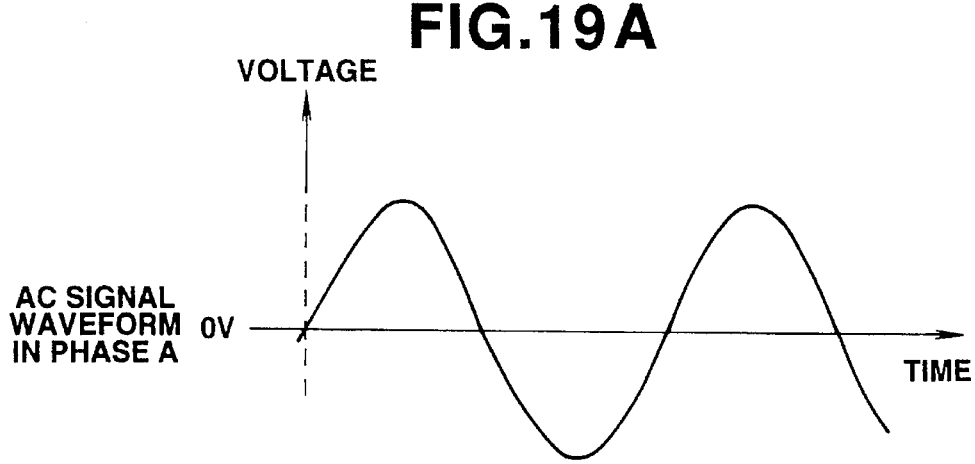
FIG. 19A is a graph which illustrates the waveform of an AC signal in phase A in a circuit for rotating an ultrasonic motor according to the seventh embodiment of the present invention.
Figure 19B:
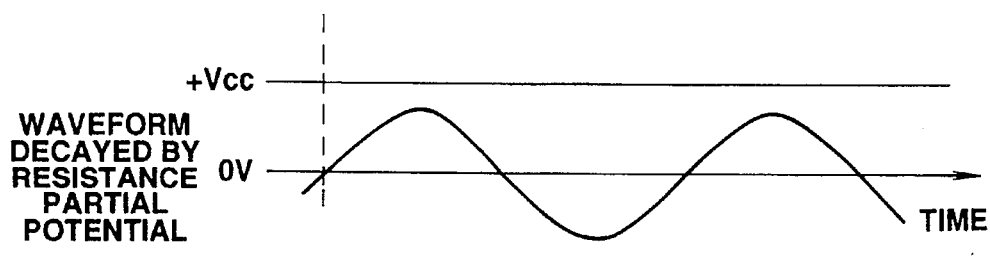
FIG. 19B is a graph which illustrates the decayed waveform due to a resistor divided potential in the circuit for rotating an ultrasonic motor according to the seventh embodiment of the present invention.
Figure 19C:
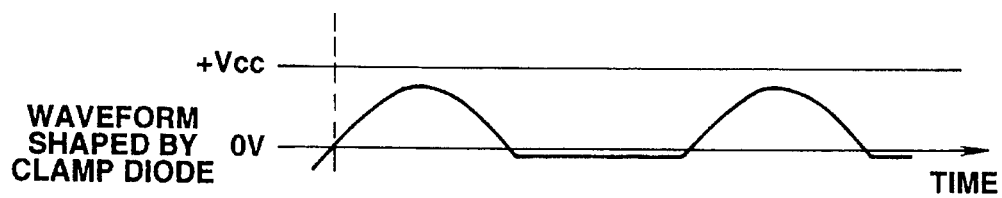
FIG. 19C is a graph which illustrates the waveform shaped by the clamp diode in the circuit for rotating an ultrasonic motor according to the seventh embodiment of the present invention.
Figure 19D:
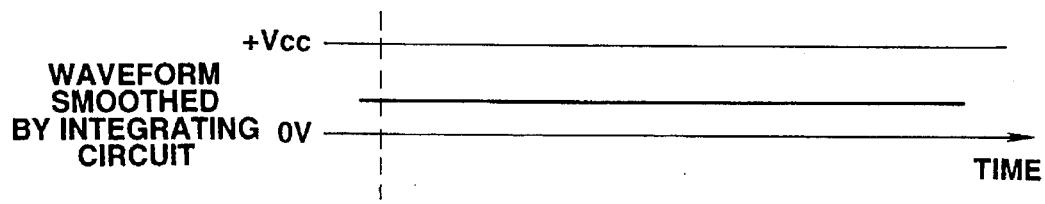
FIG. 19D is a graph which illustrates the waveform smoothed by an integrating circuit in the circuit for rotating an ultrasonic motor according to the seventh embodiment of the present invention.

A seventh embodiment of the present invention will now be described. FIG. 18 is an electrical circuit diagram which illustrates a circuit for rotating an ultrasonic motor according to the seventh embodiment. FIGS. 19A to 19D are graphs which illustrate waveforms observed at various points of the circuit.

The circuit for rotating an ultrasonic motor according to the seventh embodiment is arranged in such a manner that a predetermined two-phase AC signal is supplied to a known ultrasonic motor 5 having two electrodes 5A and 5B and the two-phase AC signal is monitored so that rotation of the ultrasonic motor 5 is controlled.

That is, the rotating circuit further comprises an oscillation circuit 1 for generating and transmitting pulse signal $\Phi ORG$ having a frequency ($4f$) which is about four times that the AC operation signal to be supplied to the ultrasonic motor 5. In addition, the rotating circuit includes a pulse conversion circuit 2 for dividing the pulse signal $\Phi ORG$ transmitted from the foregoing oscillation circuit 1 into 4-phase pulse signals $\phi 1$ to $\phi 4$ to transmit them. Moreover, the rotating circuit comprises switching transistors Q1 to Q4 for performing switching operations to respectively correspond to the pulse signals $\phi 1$ to $\phi 4$ transmitted from the pulse conversion circuit 2. The rotating circuit further comprises a transformer T1 having an intermediate tap disposed on the primary side thereof to which positive voltage supplied from a DC power source 10 is supplied and arranged in such a manner that the primary side is turned on due to the switching operations of the switching transistors Q1 and Q2 and, therefore, AC signal VA in phase A is transmitted to the secondary side. In addition, the rotating circuit comprises a transformer T2 having the primary side which is turned on due to the switching operations of the switching transistors Q3 and Q4 to transmit AC signal VB in phase B to the secondary side thereof.

The rotating circuit further comprises a voltage dividing circuit 39, connected to an end (on the phase A side) of the output from the transformer T1, arranged to divide and decay the voltage level of the AC signal in the phase A and comprising resistors R31 and R32. In addition, the rotating circuit comprises a rectifying circuit 40 having clamp diodes D31 and D32 for rectifying the decayed AC signal (see FIG. 19B). In addition, the rotating circuit comprises an integrating circuit 41 arranged to integrate and smooth the rectified signal (see FIG. 19C) and comprising a resistor R33 and a capacitor C31. Moreover, the rotating circuit comprises an A/D converter 34 that receives analog DC voltage V1 (see FIG. 19D) obtained by dividing, rectifying and smoothing the AC signal in the phase A so as to convert it into digital DC voltage V2 to be transmitted. Further, the rotating circuit comprises a referencer 36 for setting digital voltage V2opt corresponding to an optimum frequency for the oscillation circuit 1 and obtained from experiments with respect to the digital DC voltage V2 which has been converted from the analog signal. The rotating circuit further comprises a comparator 37 which receives the digital voltage V2opt supplied from the referencer 36 and the digital voltage V2 supplied from the A/D converter 34 to subject the voltage V2 to a comparison with the voltage V2opt so as to transmit potential difference $\Delta V$. The rotating circuit comprises a V-f converter 38 which receives the potential difference $\Delta V$ and which optimizes the frequency of the oscillation circuit 1 by controlling the oscillation frequency with deviated frequency value $\Delta f$ obtained by conversion from the potential difference $\Delta V$ and including the direction of displacement and the quantity of displacement of the foregoing frequency.

Figure 20:
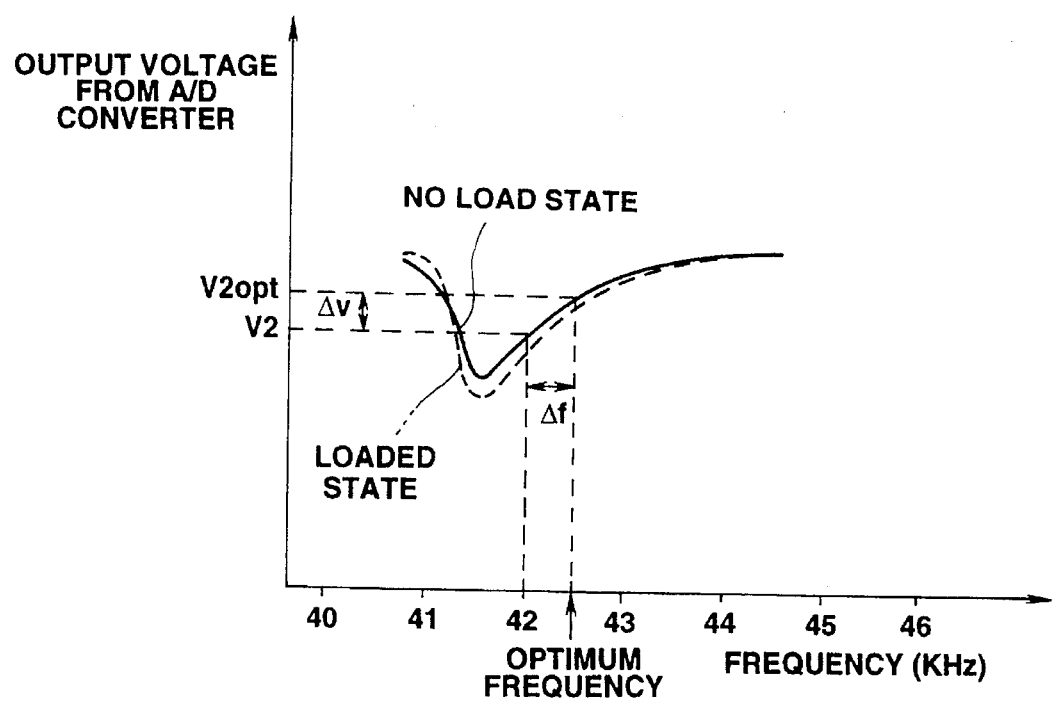
FIG. 20 is a graph which illustrates the relation between the output voltage level from an A/D converter and the operation frequency in a loaded state and a non-loaded state of the circuit for rotating an ultrasonic motor according to the seventh embodiment of the present invention.

With reference to FIG. 20, the operation of the seventh embodiment will now be described.

The FIG. 20 is a graph having an axis of abscissa representing frequency and an axis of ordinate representing output voltage from the A/D converter. At a certain moment, the digital voltage V2 transmitted from the A/D converter 34 and the digital voltage level V2opt set to correspond to the optimum frequency are supplied to the comparator 37, and the potential difference $\Delta V$ is transmitted to the V-f converter 38. The V-f converter 38 converts, from the potential difference $\Delta V$, the deviated frequency $\Delta f$, which is the difference from the optimum frequency, to transmit the deviated frequency $\Delta f$ to the oscillation circuit 1 so that the oscillation frequency is controlled to the optimum frequency.

For example, a characteristic curve realized in a non-loaded state will now be described. Assuming that the frequency of the oscillation circuit 1 corresponding to the digital voltage V2 of the A/D converter from the phase A at a certain moment is 42 KHz, the potential difference between the digital voltage V2opt, when the optimum frequency is 42.5 KHz, and the digital voltage V2 is $\Delta V$. When the potential difference $\Delta V$ from the voltage V2opt is converted to deviated frequency $\Delta f$ corresponding to the optimum frequency of 42.5 KHz, the difference in the deviated frequency is 0.5 KHz. Therefore, the control must be performed in such a manner that the oscillation frequency of the oscillation circuit 1 is raised by 0.5 KHz. Similarly, the optimum frequency in the loaded state can be controlled.

According to the operation of the seventh embodiment, the optimum operation frequency for the ultrasonic motor which has no monitor electrode, and which encounters considerable load change, can be followed similar to each of the foregoing embodiments.

An eighth embodiment of the present invention will now be described.

Figure 21:
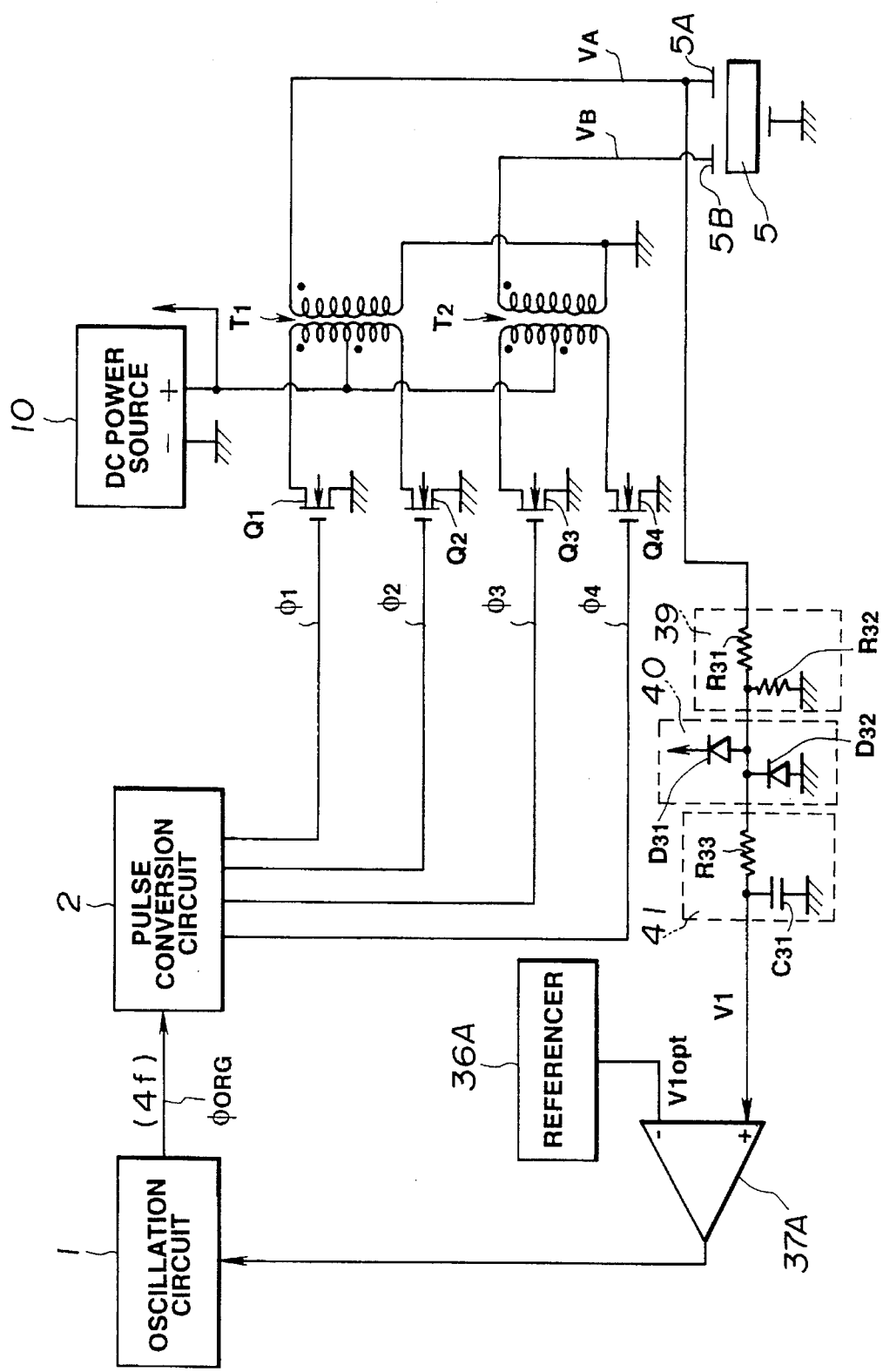
FIG. 21 is an electrical circuit diagram which illustrates an eighth embodiment of the circuit for rotating an ultrasonic motor according to the present invention.

FIG. 21 is an electrical circuit diagram which illustrates a circuit for rotating an ultrasonic motor according to the eighth embodiment of the present invention.

The eighth embodiment is different from the seventh embodiment only in that the circuit arranged from the A/D converter to the V/f converter is replaced by a comparator circuit. The residual circuit structures are substantially the same as the seventh embodiment. Therefore, the description will be made about only the different portions, and the same reference numerals are given to the same circuit elements and their descriptions are omitted here.

The analog DC voltage V1 obtained by decaying, rectifying and smoothing the AC signal VA in the phase A by the voltage dividing circuit 39, the rectifying circuit 40 and the integrating circuit 41 and the analog voltage V1opt to be transmitted from a referencer 36A and corresponding to a predetermined optimum frequency are supplied to positive and negative input terminals of a comparator 37A. The two voltage levels are subjected to a comparison, and an output representing the result of the comparison is supplied to the oscillation circuit 1.

The analog voltage V1opt to be set to correspond to the optimum frequency is previously obtained from experiments and stored in referencer 36A.

The oscillation circuit 1 is operated to lower the oscillation frequency if high (H) level voltage has been supplied from the comparator 37A. If low (L) level voltage has been supplied, the oscillation circuit 1 is operated to raise the oscillation frequency. Thus, the frequency is controlled.

Also the thus-constituted eighth embodiment enables following of the optimum operation frequency for an ultrasonic motor which has no monitor electrode and which encounters considerable load change.

A ninth embodiment of the present invention will now be described.

Figure 22:
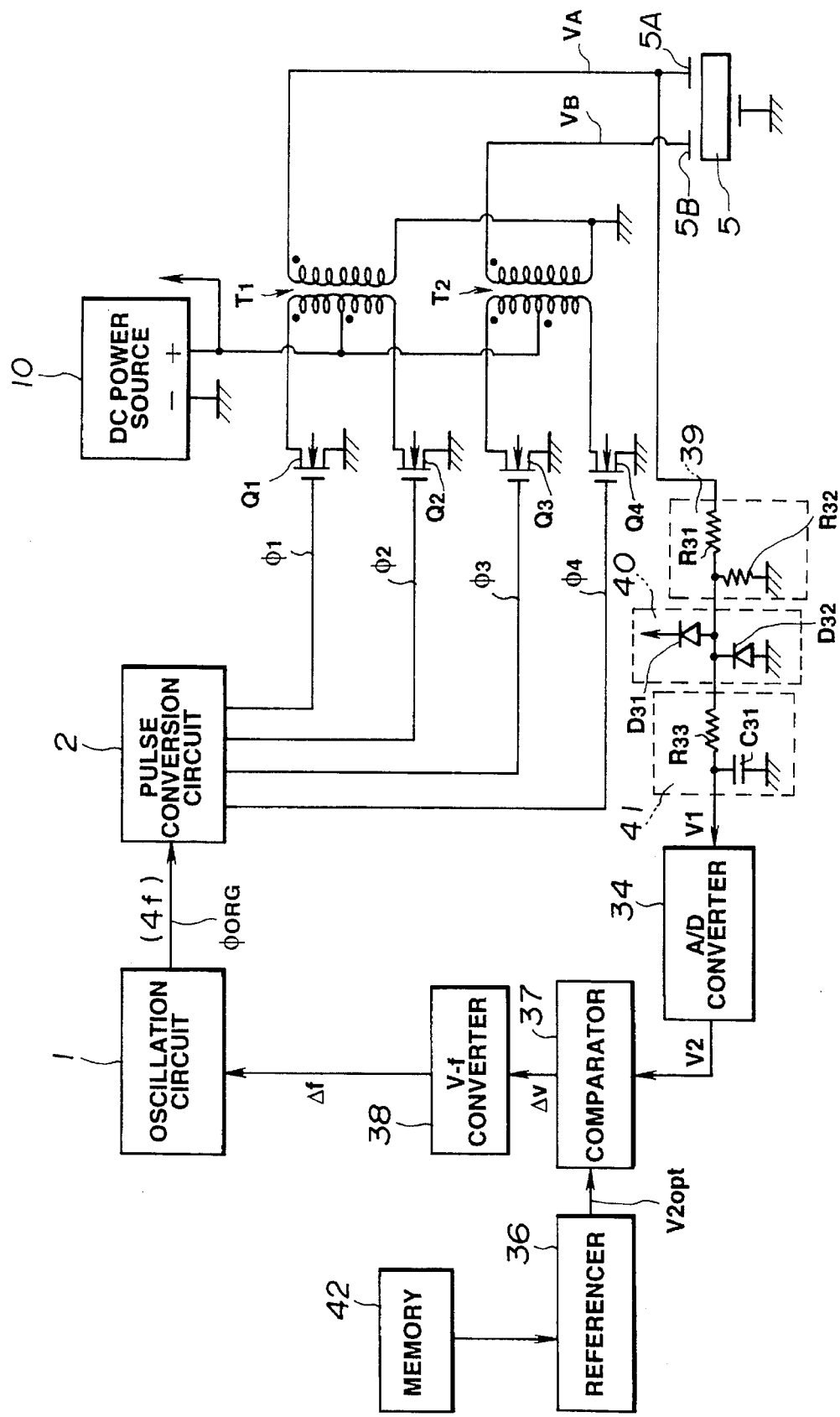
FIG. 22 is an electrical circuit diagram which illustrates a ninth embodiment of the circuit for rotating an ultrasonic motor according to the present invention.

FIG. 22 is an electrical circuit diagram which illustrates a circuit for rotating an ultrasonic motor according to the ninth embodiment.

The circuit for rotating an ultrasonic motor according to the ninth embodiment is different from the seventh embodiment only in that a memory 42 is added to the referencer 36 according to the seventh embodiment. The residual circuit structures are substantially the same as those according to the seventh embodiment. Therefore, the description will be made about the different portions, the same reference numerals are given to the same elements, and their descriptions are omitted here.

Similar to the second, fourth and sixth embodiments, the ninth embodiment has been established on the basis of a fact that each ultrasonic motor has a peculiar optimum frequency, the ninth embodiment being arranged in such a manner that digital voltage V2opt corresponding to an optimum frequency for each ultrasonic motor is previously stored on the memory 42, and the frequency of the oscillation circuit is controlled in accordance with the voltage V2opt stored on the memory similar to the seventh embodiment.

According to the thus-constituted ninth embodiment, manufacturing errors occurring in each ultrasonic motor can be corrected, and therefore the optimum operation frequency can be followed further accurately.

The ninth embodiment may be arranged in such a manner that digital voltage levels V2opt corresponding to plural optimum frequencies are previously stored in the memory so as to be selectively used in accordance with the power supply voltage or the like.

Figure 23:
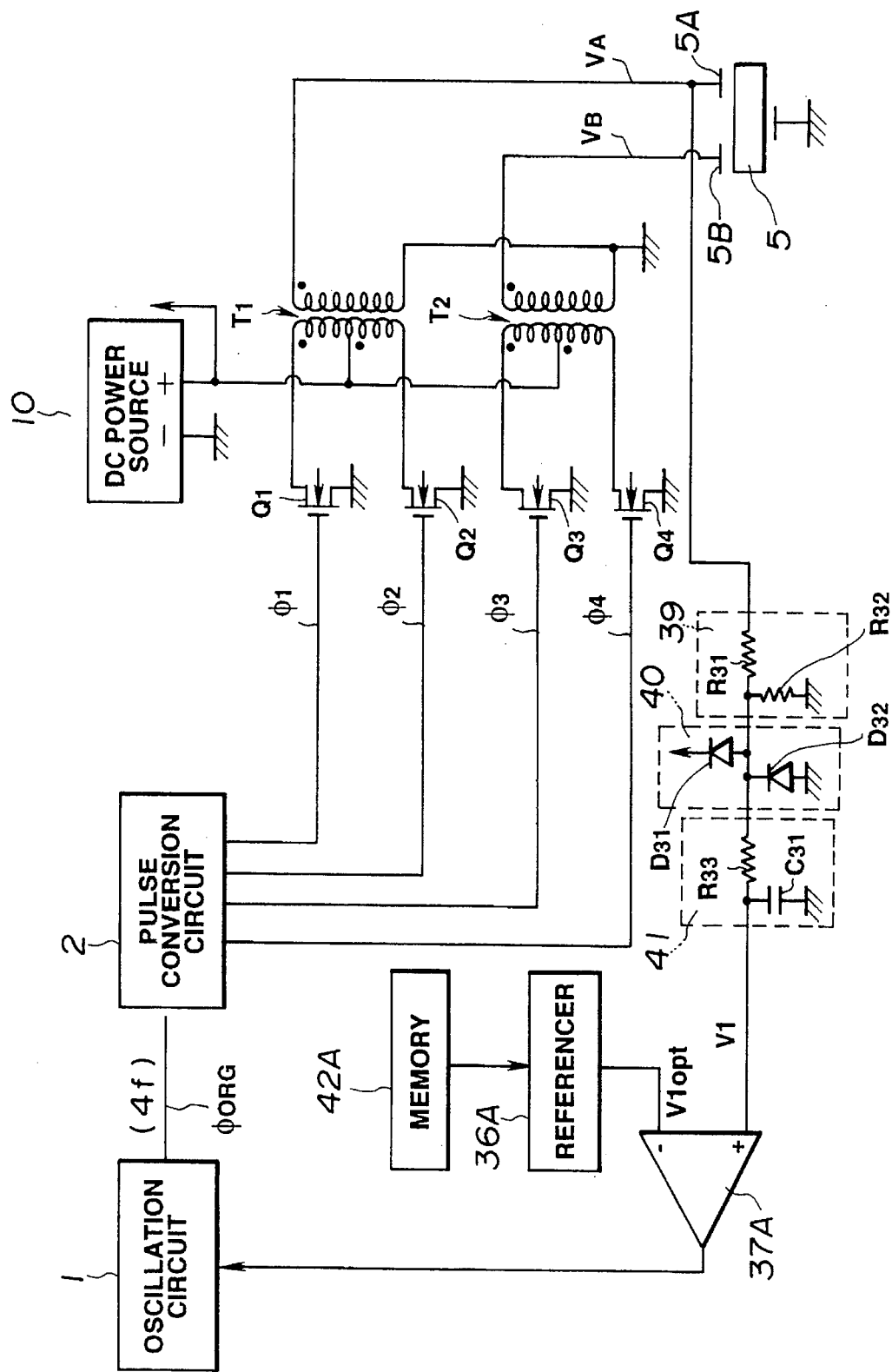
FIG. 23 is an electrical circuit diagram which illustrates a tenth embodiment of the circuit for rotating an ultrasonic motor according to the present invention.

A tenth embodiment of the present invention will now be described. FIG. 23 is an electrical circuit diagram which illustrates a circuit for rotating an ultrasonic motor according to the tenth embodiment.

Similar to the ninth embodiment, the circuit for rotating an ultrasonic motor according to the tenth embodiment differs from the eighth embodiment in that a memory 42A is added to a referencer 36A. The residual structures are substantially the same as those of the eighth embodiment. Also the tenth embodiment is established on the basis of the fact that each ultrasonic motor has a peculiar optimum frequency similarly to the second, fourth, sixth and ninth embodiments. The tenth embodiment is arranged in such a manner that analog voltage V1opt corresponding to an optimum frequency for each motor is previously stored on the foregoing memory, and the frequency of the oscillation circuit is, similar to the eighth embodiment, controlled in accordance with the voltage V1opt stored in the memory.

According to the thus-constituted tenth embodiment, manufacturing errors occurring in each ultrasonic motor can be corrected, and therefore the optimum operation frequency can be followed further accurately.

Although each of the seventh embodiment to the tenth embodiment is arranged in such a manner that only the phase A of the AC signal to be supplied to the electrodes of the ultrasonic motor is monitored, only the phase B or both of the phases A and B may be monitored.

An eleventh embodiment of the present invention will now be described.

Figure 24:
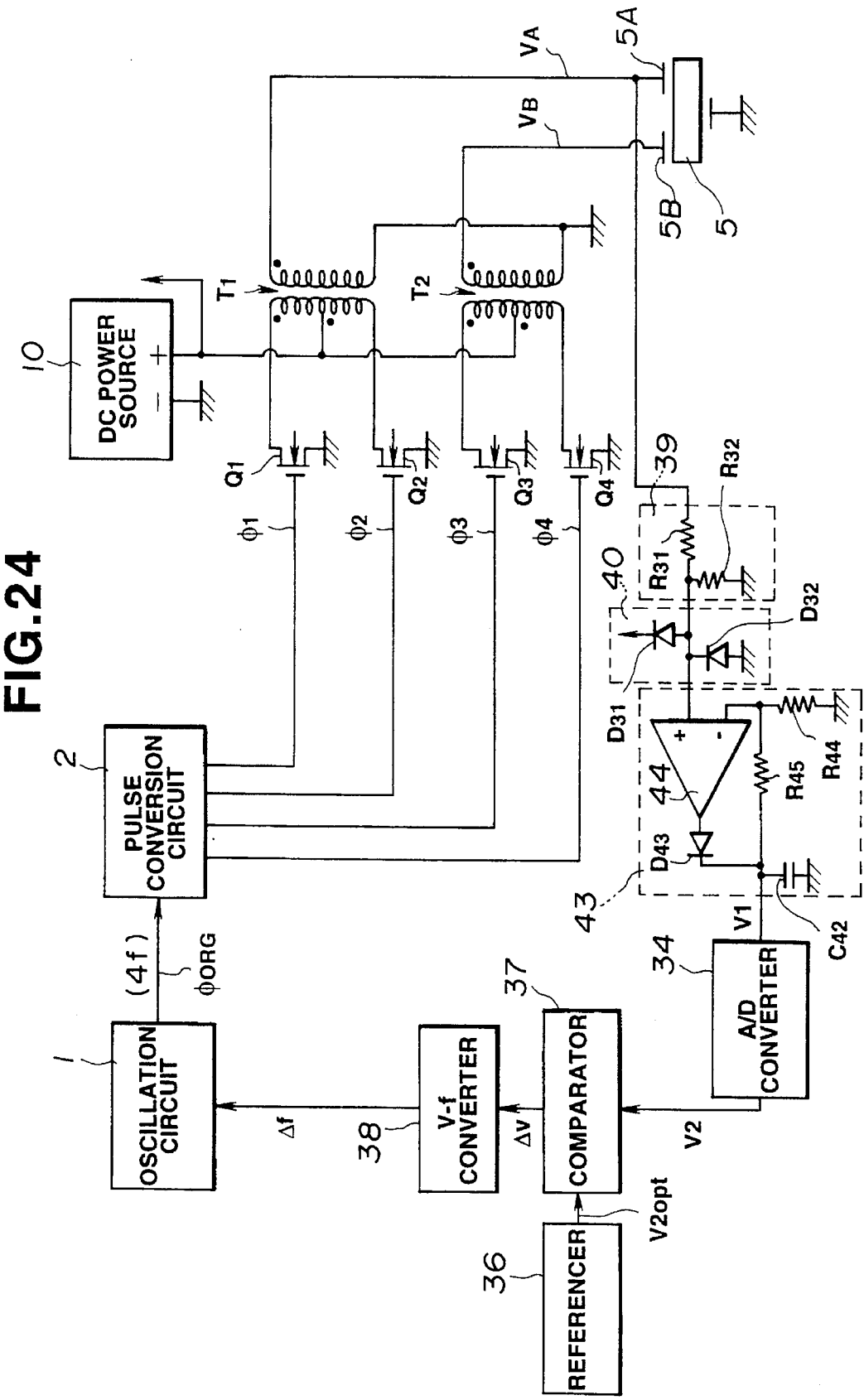
FIG. 24 is an electrical circuit diagram which illustrates an eleventh embodiment of the circuit for rotating an ultrasonic motor according to the present invention.

FIG. 24 is an electrical circuit diagram which illustrates a circuit for rotating an ultrasonic motor according to an eleventh embodiment. The eleventh embodiment employs a peak hold circuit in place of the integrating circuit 41 according to the seventh embodiment.

Figure 25:
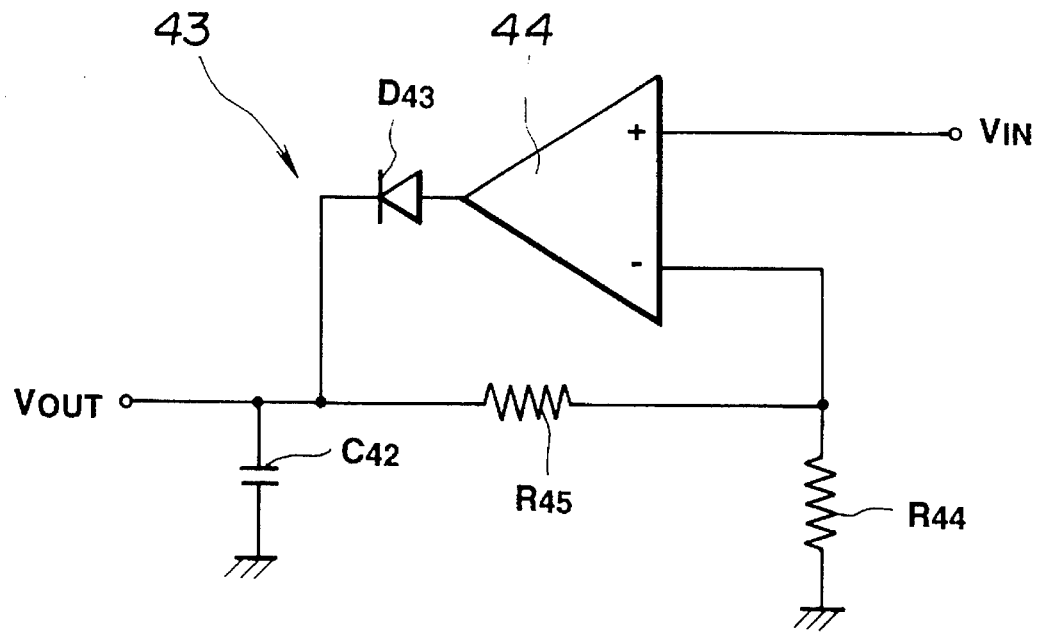
FIG. 25 is an electrical circuit diagram which illustrates a peak hold circuit of the circuit for rotating an ultrasonic motor according to the eleventh embodiment.

FIG. 25 is an electrical circuit diagram which illustrates the detailed structure of the peak hold circuit.

A peak hold circuit 43 according to this embodiment comprises an amplifying operation amplifier 44 having a positive input terminal which receives voltage VIN, the peak of which is held. A gain determined by an input resistor R44 of an inversion terminal and a feedback resistor R45 amplifies the voltage VIN which is then transmitted from the output terminal. The foregoing output is charged into a capacitor C42, and the peak value of the output is held in the capacitor C42. In order to prevent discharge of electric charges in the capacitor C42 through the output terminal of the operation amplifier 44, the diode D43 is inserted in series in a direction toward the output to prevent a counterflow of the charge. In order to eliminate an influence of the discharge upon the feedback resistor R45, the resistor R45 must have a high resistance. Then, voltage VOUT obtained by holding the peak of the thus-supplied voltage VIN is transmitted.

The peak hold circuit 43 according to the eleventh embodiment may be used in place of the integrating circuit 41 according to any one of the seventh, eighth, ninth and tenth embodiments.

As described above, according to each of the present invention, a circuit for rotating an ultrasonic motor can be provided which is able to follow the optimum operation frequency for a low cost ultrasonic motor which has no monitor electrode and which is not easily affected by the load change.

In this embodiment, it is apparent that working modes different in a wide range can be formed on this basis of this invention without departing from the spirit and scope of the invention. This invention is not restricted by any specific embodiment except as may be limited by the appended claims.

What is claimed is:

1. A device for rotating a traveling-wave-type ultrasonic motor having an electromechanical conversion means to which two phase AC signals generated from a DC power source and having a phase difference of 90 degrees are supplied, said device for rotating a traveling-wave-type ultrasonic motor comprising:

(a) a pulse generating circuit means for generating four phase pulse signals, an output frequency of each of which can be varied in response to a predetermined supplied digital signal;

(b) an electric power amplifying circuit means including switching means responsive to said four phase pulse signals for selectively coupling current from said DC power source to different inputs of transformer means and thereby operating said transformer means for generating two AC signals having a phase difference of 90 degrees, said two AC signals being supplied to said ultrasonic motor;

(c) said switching means comprising a switching device of the voltage driven type being turned on and off by an applied voltage;

(d) a waveform shaping circuit means that receives one of said two AC signals to convert the AC signal into a voltage amplitude; and (e) a phase comparison circuit means which receives an output signal from said waveform shaping circuit means and one of said four phase pulse signals that corresponds to said signal received by said waveform shaping circuit means for detecting a phase difference therebetween, said phase comparison circuit means transmitting an output representing a detected phase difference to said pulse generating circuit, wherein said output frequency from said pulse generating circuit is varied so that said phase difference is maintained at a predetermined value.

2. A device for rotating a traveling-wave-type ultrasonic motor according to claim 1 further comprising digital storage means for storing a plurality of values peculiar to the associated ultrasonic motor each of the plurality of values being related to one of a plurality of output voltages of said DC power source, wherein one of said plurality of values is supplied to said pulse generating circuit means from the storage means is selected whose associated DC voltage value is substantially the same as a voltage output of said DC source.

3. A device for rotating a traveling-wave type ultrasonic motor according to claim 2 wherein said first value represents a given optimum phase difference of the associated ultrasonic motor.

4. A device for rotating a traveling-wave-type ultrasonic motor according to claim 1, wherein said waveform shaping circuit means includes a Schmitt trigger circuit.

5. A device for rotating a traveling-wave-type ultrasonic motor according to claim 1, wherein said power amplifying circuit is so constructed that positive voltages are outputted from said transformers when a positive voltage is imposed on the input terminal of said switching device, and wherein said phase difference is in a range of 0 to +5 degrees, wherein the + (plus) sign indicates that a timing at which outputs from said transformers are changed from negative to positive lags behind a rise time of a single phase pulse signal coupled to said switching means.

6. A device for rotating a travelling-wave-type ultrasonic motor according to claim 1, further comprising digital storage means for storing a plurality of given optimum phase differences and a plurality of DC power source output values, each associated with one of said given optimum phase differences whereby selection of one of said given optimum phase difference values is made by selection of a DC power source output value at which the power supply is operating.

7. A device for rotating a travelling-wave-type ultrasonic motor according to claim 1 wherein said waveform shaping circuit means comprises inverter circuit means for converting an input applied thereto to a digital signal comprised of either of two signal levels and having a threshold value which assures that an output of the inverter circuit means, when compared with the pulse signal, provides a phase difference which is substantially unchanged in spite of changes in operating frequency of the ultrasonic motor due to changes in load experienced by the ultrasonic motor.

8. A device for rotating a travelling wave-type ultrasonic motor according to claim 1 wherein said switching device is an MOS-type transistor.

9. A device for rotating an ultrasonic motor which is operated when an operation signal is supplied to an electromechanical conversion means thereof, said conversion means for rotating an ultrasonic motor comprising:

(a) oscillation means, an oscillation frequency from which is made variable;

(b) a DC power source;

(c) an inductive means and means for switching a direction of an output signal from said DC power source to said inductive means in synchronization with an output from said oscillation means to enable said inductive means to generate an AC signal for driving said electromechanical conversion means;

(d) said switching means comprising a switching device of the voltage driven type being turned on and off by an applied voltage;

(e) detection means for detecting a phase difference between said output from said oscillation means and said AC signal; and (f) control means for controlling said oscillation frequency of said oscillation means in accordance with an output from said detection means.

10. A device for rotating a travelling wave-type ultrasonic motor according to claim 9 wherein said switching device is an MOS-type transistor.

11. A device for rotating an ultrasonic motor which is operated when an operation signal is supplied to an electromechanical conversion means thereof, said conversion means for rotating an ultrasonic motor comprising:

(a) oscillation means, an oscillation frequency from which is made variable;

(b) a DC power source;

(c) an inductive means and means for switching a direction of an output signal from said DC power source to said inductive means in synchronization with an output from said oscillation means to generate an AC signal supplied to said electromechanical conversion means;

(d) said switching means comprising a switching device of the voltage driven type being turned on and off by an applied voltage;

(e) detection means for detecting a phase difference between an output from said oscillation means and a digital signal shaped according to whether said AC signal is larger or smaller than a predetermined threshold value; and (f) control means for controlling said oscillation frequency of said oscillation means in accordance with an output from said detection means.

12. A device for rotating a travelling wave-type ultrasonic motor according to claim 11 wherein said switching device is an MOS-type transistor.

13. A device for rotating an ultrasonic motor which is operated when an operation signal is supplied to an electromechanical conversion means thereof, said conversion means for rotating an ultrasonic motor comprising:

(a) oscillation means, an oscillation frequency from which is made variable;

(b) a DC power source;

(c) an inductive means and means for switching a direction of an output signal from said DC power source to said inductive means in synchronization with an output from said oscillation means to generate an AC signal supplied to said electromechanical conversion means;

(d) means for shaping the AC signal supplied to said electromechanical conversion means for converting said AC signal to a binary signal including means for comparing said AC signal to a predetermined non-zero threshold level;

(e) detection means for detecting a phase difference between said AC signal and a signal obtained from said means for shaping said AC signal; and (f) control means for controlling said oscillation frequency of said oscillation means in accordance with an output from said detection means.

14. A device for rotating an ultrasonic motor according to claim 13, wherein said means for shaping said AC signal comprises means for generating a DC signal level which varies as a function of frequency of said AC signal.

15. A device for rotating an ultrasonic motor which is operated when an operation signal is supplied to an electromechanical conversion means thereof, said conversion means for rotating an ultrasonic motor comprising:

(a) oscillation means, an oscillation frequency from which is made variable;

(b) a DC power source;

(c) an inductive means and means for switching a direction of an output signal from said DC power source to said inductive means in synchronization with an output from said oscillation means to generate an AC signal supplied to said electromechanical conversion means;

(d) means for detecting a voltage value of said AC signal; and (e) control means responsive to said detecting means for controlling said oscillation frequency of said oscillation means in accordance with a voltage value of said AC signal compared against a value representing a preferred operating frequency.

16. A device for rotating an ultrasonic motor which is operated when an operation signal is supplied to an electromechanical conversion means thereof, said conversion means for rotating an ultrasonic motor comprising:

(a) an oscillation circuit means, an oscillation frequency from which is made variable;

(b) a plurality of switching means which receive an output from said oscillation circuit to alternately switch on and off;

(c) switching means comprising switching devices of the voltage-driven type being alternately turned on and off responsive to an output from said oscillation circuit means;

(d) transformer means including a primary coil, to which said plurality of switching means are connected to first and second ends thereof, and which receives an output from a DC power source at substantially a central portion thereof for a secondary coil in which an AC signal is generated when said plurality of switching devices are switched on and off to change a current signal direction in said primary coil so that said AC signal is supplied to said electromechanical conversion means by said secondary coil;

(e) a detection circuit means for detecting a phase difference between said AC signal transmitted from said transformer means and an output from said oscillation circuit; and (f) an oscillation control circuit means for controlling the oscillation frequency of said oscillation circuit in accordance with said phase difference detected by said detection means.

17. A device for rotating a travelling wave-type ultrasonic motor according to claim 16 wherein said switching device is an MOS-type transistor.

18. A device for rotating an ultrasonic motor which is operated when an operation signal is supplied to an electromechanical conversion means thereof, said conversion means for rotating an ultrasonic motor comprising:

(a) an oscillation circuit means, an oscillation frequency from which is made variable;

(b) a plurality of switching means for receiving an output from said oscillation circuit to alternately switch on and off;

(c) said switching means comprising a switching device of the voltage driven type being turned on and off by an applied voltage;

(d) a transformer means including a primary coil, said plurality of switching devices being connected to first and second ends thereof, and which receives an output from a DC power source at a central portion thereof and a secondary coil generating an AC signal when said plurality of switching devices are switched on and off to change a signal direction in said primary coil enabling said secondary coil to supply an AC signal to said electromechanical conversion means;

(e) a detection circuit means for detecting a phase difference between an output from said oscillation circuit means and a digital signal shaped according to whether said AC signal is larger or smaller than a predetermined threshold; and (f) a control circuit means for controlling said oscillation frequency of said oscillation circuit in accordance with said phase difference detected by said detection circuit means.

19. A device for rotating a travelling wave-type ultrasonic motor according to claim 18 wherein said switching device is an MOS-type transistor.

20. A device for rotating an ultrasonic motor using a DC power source and generating an AC signal by switching means for selectively coupling current from said DC source to different inputs of an inductive means coupled to supply said AC signal to an electromechanical conversion means to rotate an ultrasonic motor having said electromechanical conversion means disposed therein, said conversion means for rotating an ultrasonic motor comprising:

(a) phase difference detection means for detecting a phase difference between a switching signal from a switching signal generating means supplied to said switching means for switching said inductive means and said AC signal;

(b) said switching means comprising a switching device of the voltage driven type being turned on and off by an applied voltage; and (c) frequency control means for controlling switching frequency of said switching signal generating means in accordance with an output from said phase difference detection means.

21. A device for rotating an ultrasonic motor according to claim 20, wherein said ultrasonic motor further includes waveform shaping means comprised of voltage comparator means having a non-zero threshold voltage, said threshold voltage having a predetermined value which is closer to 0 V than an expected minimum amplitude of said AC signal, said voltage comparator means for shaping a waveform of said AC signal responsive to a comparison of said AC signal with said non-zero threshold voltage and wherein said phase difference detection means detects a phase difference between said switching signal and a signal obtained by shaping a waveform of said AC voltage by said waveform shaping circuit means.

22. A device for rotating a travelling wave-type ultrasonic motor according to claim 20 wherein said switching device is an MOS-type transistor.

23. A circuit for rotating an ultrasonic motor having an electromechanical conversion means disposed therein by means for supplying an AC signal to said electromechanical conversion device, said circuit for rotating an ultrasonic motor comprising:

(a) parameter value generating means coupled to receive only said AC signal for monitoring an operating state of said ultrasonic motor to generate a parameter value corresponding to said operating state;

(b) means for storing a reference parameter value which corresponds to a parameter value of said ultrasonic motor when operating at an optimum state:

(c) comparison means for comparing said generated parameter value and said stored reference parameter value; and (d) control means for controlling an operating frequency of the AC signal applied to said ultrasonic motor in accordance with an output from said comparison means, wherein said parameter value generating means and said reference parameter value are, at an operating frequency at which said parameter value detected by said parameter value generating means becomes the same as said reference parameter value, set so that a change in a generated parameter value of said parameter value generating means is substantially prevented even if a load acting on said ultrasonic motor has been changed; and said parameter value generating means comprising peak hold circuit means for providing a DC signal which represents a peak value of an AC signal applied thereto for comparison with said stored reference parameter value.

24. A circuit for rotating an ultrasonic motor according to claim 23, comprising means for converting said peak value to a digital value; said stored reference value being a digital value and said comparison means comprising means for comparing said stored digital value and said digital value generated by said converting means.

25. A circuit for rotating an ultrasonic motor having an electromechanical conversion means disposed therein by means for supplying an AC signal to said electromechanical conversion device, said circuit for rotating an ultrasonic motor comprising:

(a) parameter value generating means coupled to receive only said AC signal for monitoring an operating state of said ultrasonic motor to generate a parameter value corresponding to said operating state;

(b) means for storing a reference parameter value which corresponds to a parameter value of said ultrasonic motor when operating at an optimum state;

(c) comparison means for comparing said generated parameter value and said stored reference parameter value; and (d) control means for controlling an operating frequency of the AC signal applied to said ultrasonic motor in accordance with an output from said comparison means, wherein said parameter value generating means and said reference parameter value are, at an operating frequency at which said parameter value detected by said parameter value generating means becomes the same as said reference parameter value, set so that a change in a generated parameter value of said parameter value generating means is substantially prevented even if a load acting on said ultrasonic motor has been changed.

* * * * *

UNITED STATES PATENT AND TRADEMARK OFFICE
CERTIFICATE OF CORRECTION

PATENT NO. : 5,563,464
DATED : October 8, 1996
INVENTOR(S) : Okubo et al.

It is certified that error appears in the above-identified patent and that said Letters Patent is hereby corrected as shown below:   On the title page, Item [75], In the Inventor's Name:  delete "OKUBU" and insert instead --OKUBO--.
Col. 7, line 1, change " to" to -- 1 to--.
Col. 7, line 3, after "set" insert --to--.
Col. 7, line 49, after "VB" delete ",".
Col. 9, line 51, change "$VB_1$" to --VB--.
Col. 9, line 52, change "$X_1$" to --VB--.
col. 10, line 34, change "$VB_1$" to --VB--.
Col. 11, line 61, delete "6" and insert --16--.
Col. 13, line 5, after "to" delete --the--.

Signed and Sealed this

Twenty-fifth Day of May, 1999

Attest:

Q. TODD DICKINSON

Attesting Officer      Acting Commissioner of Patents and Trademarks